(12) United States Patent
Higginbottom et al.

(10) Patent No.: US 6,978,048 B1
(45) Date of Patent: Dec. 20, 2005

(54) ENCODING METHOD AND APPARATUS

(75) Inventors: Paul Raymond Higginbottom, Castle Hill (AU); Eric Majani, Rennes (FR); James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/523,595

(22) Filed: Mar. 10, 2000

(30) Foreign Application Priority Data

Mar. 12, 1999 (AU) ..................... PP9186

(51) Int. Cl.$^7$ ............... G06K 9/00; H04N 7/18
(52) U.S. Cl. ................... 382/240; 375/240.19
(58) Field of Search ............... 382/232–251, 382/276; 375/240.03, 240.01, 240.11, 240.24, 375/240.19, 240.18

(56) References Cited

U.S. PATENT DOCUMENTS

| | | | | |
|---|---|---|---|---|
| 4,943,855 A * | 7/1990 | Bheda et al. | .......... | 375/240.11 |
| 5,600,373 A * | 2/1997 | Chui et al. | ............. | 375/240.1 |
| 5,710,835 A | 1/1998 | Bradley | .................. | 382/233 |
| 6,229,926 B1 * | 5/2001 | Chui et al. | ............... | 382/240 |
| 6,236,757 B1 * | 5/2001 | Zeng et al. | ............... | 382/240 |

FOREIGN PATENT DOCUMENTS

| | | | |
|---|---|---|---|
| AU | 199887096 B2 | 9/1998 |
| AU | 199957147 B2 | 10/1999 |
| AU | 199957150 B2 | 10/1999 |

OTHER PUBLICATIONS

Christos Chrysafis et al., "Line Based. Reduced Memory, Wavelet Image Compression", Integrated Media Systems Center. pp. 398-407 (1998).

Pamela Cosman et al., "Memory Constrained Wavelet Based Image Coding", IEEE, vol. 5, No. 9, pp. 221-223 (1998).
Martin Boliek et al., "Decoding Compression with Reversible Embedded Wavelets (CREW) Codestreams", Journal of Electronic Imaging, vol. 7, No. 3, pp. 402-409 (Jul. 1998).
Bruce et al., "Wavelet Analysis" IEEE Spectrum, pp. 26-35, Oct. 1996.
Stollinitz et al., "Wavelets for Computer Graphics" Morgan Kaufmann Publishers, Inc., pp. 18-31, 1996.

* cited by examiner

*Primary Examiner*—Bhavesh M. Mehta
*Assistant Examiner*—Duy M. Dang
(74) *Attorney, Agent, or Firm*—Fitzpatrick, Cella, Harper & Scinto

(57) ABSTRACT

A method of encoding an digital image (502) by a discrete wavelet transform (DWT) to a predetermined level of decomposition on a block by block basis, each block (1501, 1504, 1506) having a specified size in number of coefficients, is disclosed. The image is divided into tiles, each having dimensions required to produce the number of coefficients in a first dimension of the transformed block at the predetermined level of decomposition, and less than the number of coefficients in a second dimension of the transformed block. At a particular DWT level, tiles are decomposed. HH, HL and LH subband coefficients are accumulated to form blocks of specified size, and these are encoded to a bit stream (402). A predetermined number of associated LL subband coefficients are similarly accumulated, the process performed recursively per DWT level until the predetermined decomposition level is attained, and the corresponding LL subband coefficients encoded to the bit stream (402).

50 Claims, 22 Drawing Sheets

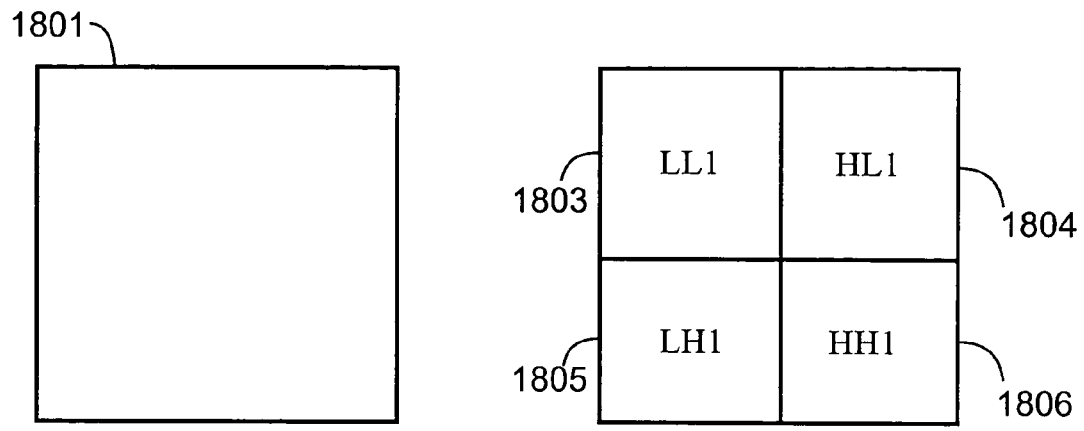
Fig. 18. One level DWT
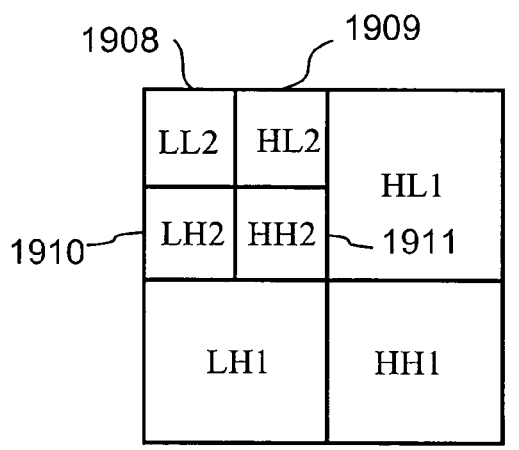
Fig. 19
Two level DWT
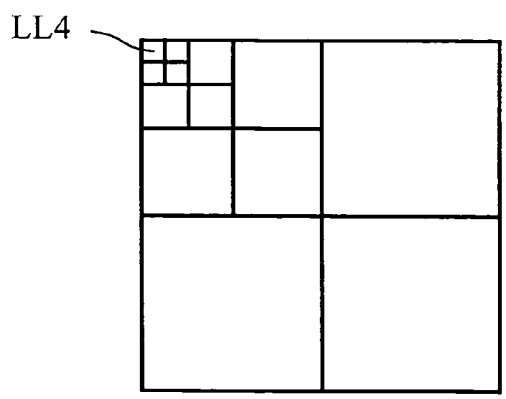
Fig. 20
Four level DWT Fig. 21  Tiling of the subbands

ENCODING METHOD AND APPARATUS

FIELD OF THE INVENTION

The present invention relates to the field of digital image compression, and in particular, to a method and apparatus for performing a wavelet decomposition of an image.

BACKGROUND TO THE INVENTION

The field of digital data compression and in particular digital image compression has attracted a great interest for some time. Most recently, compression schemes based on a Discrete Wavelet Transform (DWT) have become increasingly popular because the DWT offers a non-redundant heirachical decomposition of an image, and resultant compression of the image provides favourable rate-distortion statistics.

Typically, the discrete wavelet transform (DWT) of an image is performed using a series of one-dimensional DWT's. A one dimensional DWT of a signal (ie an image row) is performed by lowpass and highpass filtering the signal, and decimating each filtered signal by 2. Decimation by 2 means that only every second sample of the filtering proc-esses is calculated and retained. When performing a convolution (filtering) the filter is moved along by two samples at a time, instead of the usual one sample. In this way, for a signal of N samples, there are N DWT samples: substantially N/2 lowpass samples and substantially N/2 highpass samples.

This is typically performed by buffering an entire image in Computer Memory such as Random Access Memory (RAM), performing the DWT on the buffered image, and then encoding the transformed image. Unfortunately, this approach requires a large amount of memory, particularly for images of 2000 pixels×2000 pixels or more, and a considerable memory bandwidth is required if sufficient processing speed is to be attained.

SUMMARY OF THE INVENTION

It is an object of the present invention to substantially overcome, or at least ameliorate, one or more disadvantages of existing arrangements.

According to a first aspect of the invention there is provided a method of encoding an digital image comprising a plurality of pixels, said image being able to be transformed by a discrete wavelet transform (DWT) to a predetermined level of decomposition, and capable of being encoded on a block by block basis, each block having a specified block size in number of coefficients, in a first and second dimension, the method comprising the steps of:

a) dividing the image into a plurality of tiles, each tile having firstly, substantially a minimum number of pixels required to produce the number of coefficients in the first dimension of said block at said predetermined level of DWT decomposition, and secondly, by less than a minimum number of pixels required to produce the number of coefficients in the second dimension of said block at said predetermined level of DWT decomposition;

b) selecting a current tile;

c) decomposing said current tile using the DWT to at least one level of decomposition to form a plurality of subbands including a LL, LH, HL and HH subband;

d) accumulating coefficients in each subband of the LH, HL and HH subbands to form blocks of said specified size, and encoding each said block to a bit stream;

e) accumulating LL subband coefficients and repeating steps b) to e) until a predetermined number of coefficients of the LL subband have been accumulated;

f) assigning as a current tile said predetermined number of accumulated LL sub-band coefficients;

g) repeating steps c) to g) until the predetermined level of decomposition is reached; and h) encoding the LL subband into the bit stream.

According to a second aspect of the invention there is provided a method of encoding an digital image comprising a plurality of pixels, said image being able to be transformed by a discrete wavelet transform (DWT) to a predetermined level of decomposition and capable of being encoded on a block by block basis, each block having a specified block size in number of coefficients, in a first and second dimension, the method comprising the steps of:

a) dividing the image into a plurality of tiles, each tile having firstly substantially a minimum number of pixels required to produce the number of coefficients in the first dimension of said block at said predetermined level of DWT decomposition, and secondly, less than a minimum number of pixels required to produce the number of coefficients in the second dimension of said block at said predetermined level of DWT decomposition;

b) selecting a tile of the image as a current tile;

c) decomposing said current tile using the DWT to a provide a plurality of coefficients in LL, LH, HL and HH subbands;

d) encoding coefficients of the LH, HL, HH subbands of a current level into a bit-stream;

e) determining if said current level is the predetermined level:

ea) encoding the coefficients of the LL subband into the bitstream, if the current level is the predetermined level; and repeating steps b) to e); and eb) storing coefficients not previously encoded of the LL subband if the current level is not the predetermined level;

f) determining if the number of said stored coefficients of the LL subband at the current level is at least a predetermined number:

fa) assigning said predetermined number of LL coefficients as a current tile, if the number of stored LL coefficients is at least said predetermined number; and repeating steps c) to f); and fb) repeating steps b) to f) if the number of stored LL coefficients is less than said predetermined number.

According to a third aspect of the invention there is provided an apparatus for encoding an image, said image being capable of being transformed by a discrete wavelet transform (DWT) to a predetermined level of decomposition and capable of being encoded on a block by block basis, each block having a specified block size in number of coefficients, in a first and second dimension, the apparatus comprising:

a) means for dividing the image into a plurality of tiles, each tile having firstly, substantially a minimum number of pixels required to produce the number of coefficients in the first dimension of said block at said predetermined level of DWT decomposition, and secondly, less than a minimum number of pixels required to produce the number of coefficients in the second dimension of said block at said predetermined level of DWT decomposition;
b) selecting means for selecting a current tile;
c) decomposing means for decomposing said current tile using the DWT to at least one level of decomposition to form a plurality of subbands including a LL, LH, HL and HH subband;
d) means for accumulating a predetermined number of coefficients of the LL sub-band coefficients;
e) means for assigning, as a current tile, said predetermined number of accumulated LL subband coefficients;
f) means for feeding back the current tile to the decomposing means for decomposing the current tile to a further level of decomposition;
g) means for accumulating coefficients in each subband of the LH, HL and HH subbands to form blocks of said specified size, and accumulating at least one block of said specified size in the LL subband at said predetermined level; and
h) encoding means for encoding each said block to a bit stream.

According to a fourth aspect of the invention there is provided an apparatus for encoding an image, said image being capable of being transformed by a discrete wavelet transform (DWT) to a predetermined level of decomposition, and capable of being encoded on a block by block basis, each block having a specified block size in number of coefficients, in a first and second dimension, the apparatus comprising:
storage means for storing at least a portion of said image, the portion of the image having firstly, substantially a minimum number of pixels required to produce the number of coefficients in the first dimension of said block at said predetermined level of DWT decomposition, and secondly, less than a minimum number of pixels required to produce the number of coefficients in the second dimension of said block at said predetermined level of DWT decomposition;
a first and second filtering means for applying a linear transform to a first and second dimension of said image portion respectively to provided a LL, LH, HL and HH subband, each subband comprising at least one coefficient;
a partial band storage means for accumulating a predetermined number of coefficients of the LL subband. and using the accumulated LL coefficient as an image portion for refiltering by the first and second filtering means to achieve a next level decomposition;
a subband storage means for accumulating said blocks of specified size for each level in the LH, HL and HH subbands, and accumulating said blocks of specified size in the LL subband at said predetermined level of decomposition; and
encoder means for encoding each accumulated block into a bit stream.

According to a fifth aspect of the invention there is provided a computer readable memory medium for storing a program for apparatus which encodes an digital image comprising a plurality of pixels, said image being able to be transformed by a discrete wavelet transform (DWT) to a predetermined level of decomposition and capable of being encoded on a block by block basis, each block having a specified block size in number of coefficients, in a first and second dimension, said program comprising:
a) code for a dividing step for dividing the image into a plurality of tiles, each tile having firstly, substantially a minimum number of pixels required to produce the number of coefficients in the first dimension of said block at said predetermined level of DWT decomposition, and secondly, less than a minimum number of pixels required to produce the number of coefficients in the second dimension of said block at said predetermined level of DWT decomposition;
b) code for a selecting step for selecting a current tile;
c) code for a decomposing step for decomposing said current tile using the DWT to at least one level of decomposition to form a plurality of subbands including an LL, LH, HL and HH subband;
d) code for an accumulating step for accumulating coefficients in each subband of the LH, HL and HH subbands to form blocks of said specified size and for encoding each said block to a bit stream;
e) code for an accumulating step for accumulating LL subband coefficients, and for repeating steps b) to e) until a predetermined number of coefficients of the LL subband have been accumulated;
f) code for an assigning step for assigning as a current tile said predetermined number of accumulated LL subband coefficients;
g) code for repeating steps c) to g) until the predetermined level of decomposition is reached; and
h) code for an encoding step for encoding the LL subband into the bit stream.

According to a sixth aspect of the invention there is provided a computer readable memory medium for storing a program for apparatus which encodes an digital image comprising a plurality of pixels, said image being able to be transformed by a discrete wavelet transform (DWT) to a predetermined level of decomposition and capable of being encoded on a block by block basis, each block having a specifyied block size in number of coefficients, in a first and second dimension, said program comprising:
a) code for a dividing step for dividing the image into a plurality of tiles, each tile having firstly, substantially a minimum number of pixels required to produce the number of coefficients in the first dimension of said block at said predetermined level of DWT decomposition, and secondly, less than a minimum number of pixels required to produce the number of coefficients in the second dimension of said block at said predetermined level of DWT decomposition;
b) code for a selecting step for selecting a tile of the image as a current tile;
c) code for a decomposing step for decomposing said current tile using the DWT filter to provide a plurality of coefficients in LL, LH, HL and HH subbands;
d) code for an encoding step for encoding coefficients of the LH, HL, HH subbands of a current level into a bitstream;
e) code for a determining step for determining if said current level is the predetermined level:
ea) code for an encoding step for encoding the coefficients of the LL subband into the bitstream, if the current level is the predetermined level; and repeating steps b) to e); and
eb) code for a storing step for storing coefficients not previously encoded of the LL subband if the current level is not the predetermined level;
f) code for a determining step for determining if the number of said stored coefficients of the LL subband at the current level is at least a predetermined number:
fa) code for an assigning step for assigning said predetermined number of LL coefficients as a current tile, if the number of stored LL coefficients is at least said predetermined number, and repeating steps c) to f); and fb) code for a repeating step for repeating steps b) to f) if the number of stored LL coefficients is less than said predetermined number.

According to a seventh aspect of the invention there is provided a method of encoding an digital image comprising a plurality of pixels, said image being able to be transformed by a discrete wavelet transform (DWT) to a predetermined number of levels of decomposition being at least two levels, and further capable of being encoded on a block by block basis, each block having a specified block size in number of coefficients, in a first and second dimension, the method comprising the steps of:

a) dividing the image into a plurality of tiles, each tile having firstly, substantially a minimum number of pixels required to produce the number of coefficients in the first dimension of said block at said predetermined level of DWT decomposition, and secondly, less than a minimum number of pixels required to produce the number of coefficients in the second dimension of said block at said predetermined level of DWT decomposition;

b) selecting a current tile;

c) decomposing said current tile using the DWT to at least one level of decomposition to form a plurality of subbands including LL, LH, HL and HH subbands;

d) accumulating coefficients in each subband of the LH, HL and HH subbands to form blocks of said specified size and encoding each said block to a bit stream;

e) accumulating LL subband coefficients and repeating steps b) to e) until a predetermined number of coefficients of the LL subband have been accumulated;

f) assigning as a current tile said predetermined number of accumulated LL sub-band coefficients;

g) repeating steps c) to g) until the predetermined level of decomposition is reached; and h) encoding the LL subband into the bit stream.

BRIEF DESCRIPTION OF DRAWINGS

Notwithstanding any other forms which may fall within the scope of the present invention, preferred forms of the invention will now be described, by way of example only, with reference to the accompanying drawings in which:

FIG. 18 illustrates an original image, and a DWT transformation thereof;

FIG. 19 illustrates a second level DWT transformation of the original image of FIG. 18;

FIG. 20 illustrates a four level DWT transformation of the original of FIG. 18;

DETAILED DESCRIPTION OF A PREFERRED EMBODIMENT

Figure 1:
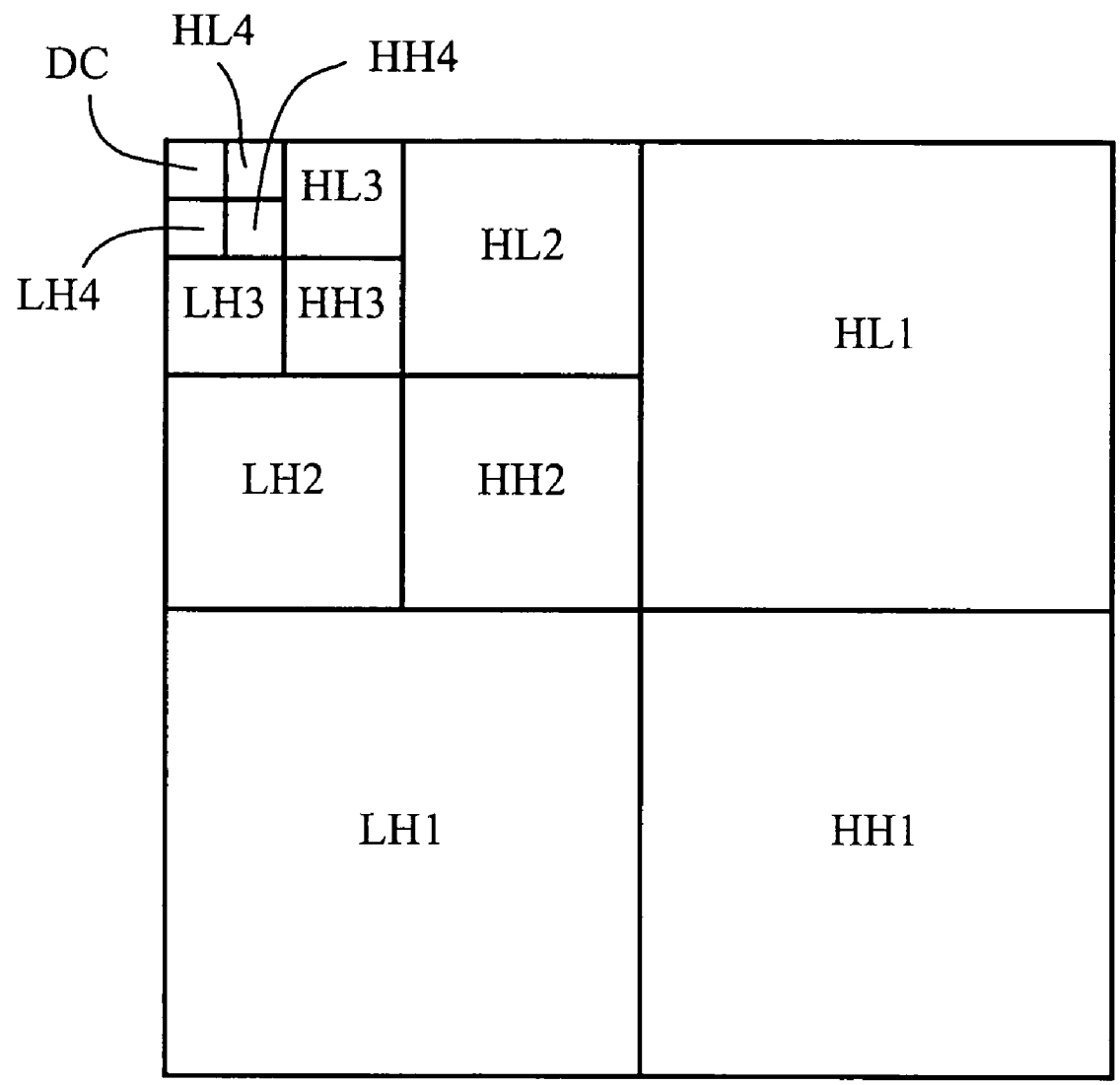
FIG. 1 illustrates various subbands of a four level discrete wavelet transform of an image.

Where reference is made in any one or more of the accompanying drawings to steps and/or features, which have the same reference numerals, those steps and/or features have for the purposes of this description the same function(s) or operation(s), unless the contrary intention appears.

Referring to FIG. 1 there is shown a discrete wavelet decomposition of an image to 4 levels. At a highest level, level 4, there is a Low-Low (LL) frequency subband (or DC subband) and a High-Low (HL4) frequency subband, a Low-High (LH4) frequency sub-band and a High-High (HH4) frequency subband. At a next level down there is a High-Low (HL3) frequency subband, a Low-High (LH3) frequency subband and a High-High (HH3) frequency subband for the present level. At the lowest level there is High-Low (HL1) frequency subband, a Low-High (LH1) frequency subband and a High-High (HH1) frequency subband.

Each level is generated by an application of a (single-level) discrete wavelet transform (DWT). Thus an application of the DWT to an image will generate a DC subband for a first level and three higher frequency subbands HL1, LH1 and HH1. The DWT is then applied to the DC (or LL) subband of first level to generate a DC subband for a second level and three higher frequency subbands HL2, LH2 and HH2. In turn, a further application of the DWT to the DC subband of the second level will generate a DC subband of a third level and three higher frequency subbands HL3, LH3 and HH3 and so on to a desired level of decomposition.

Consequently, a four level decomposition described above requires four applications of the (single-level) DWT, a first application to the image and subsequent applications to the resultant Low-Low frequency subbands in a recursive manner as described above.

The preferred embodiment of the present invention achieves a predetermined level of decomposition, in a memory efficient and low memory bandwidth (bytes per pixel) implementation. Further, the implementation of the preferred embodiment is substantially independent of a size of the image to be decomposed (for images typically greater than 1K pixels by 1K pixels). That is, a discrete wavelet decomposition of an image at a predetermined level is provided by memory buffers with total memory capacity less than that required to buffer the entire image and substantially independent of a width or height of the image.

The implementation according to the preferred embodiment of the present invention achieves efficient memory buffering and low memory bandwidth by fixing the number of maximum levels of DWT decomposition, dividing an image to be decomposed into a plurality of tiles and requiring that a first dimension of each tile be substantially a minimum number of pixels required to produced a predetermined size DC block in a corresponding (first) dimension of the DC block at the maximum level of a DWT decomposition. Further, a second dimension of each tile is less than the minimum number of pixels required to produced a corresponding (second) dimension of the predetermined size DC block. Preferably, the second dimension of each tile has a minimum length, measured in pixels, that is required to produce a (fraction) sub-multiple of a corresponding dimension of the predetermined size DC block at the maximum level.

For example, using a Daubechies 9/7 DWT filter (i.e. a 9 tap lowpass and 7 tap highpass), and entropy coding DWT blocks (arrays) of 32 coefficients×32 coefficients (height×width), at each level to a maximum of 4 levels of DWT decomposition would require, according to the preferred embodiment, a sub-division of an image into a plurality of overlapping tiles, each tile being 617 pixel in a first dimension (e.g. height of a tile) and 71 pixels in a second dimension (e.g. width of a tile). Each tile is DWT decomposed to 4 levels, with intermediate buffering of the Low-Low frequency portions at each iteration of the decomposition, to produce a predetermined number of DC coefficients. After processing approximately nine (9) such tile, a 32×32 block of DC coefficient is recovered and entropy coded. Through each of the iteration, 32×32 blocks of higher frequency coefficients (eg HL, LH and HH at each level) are also entropy coded.

The preferred embodiment will be described, hereinafter, predominately with reference to a four level DWT decomposition of an image using a Daubechies 9/7 DWT filter and subsequent entropy coding of 32×32 blocks of DWT coefficients, however the invention is not limited thereto. A different predetermined maximum number of decomposition levels, a different filter and/or a different block size of accumulated coefficients before entropy coding the block can be used without departing from the scope and spirit of the invention. For example a 5 level DWT decomposition can be performed and/or 64×64 blocks of DWT coefficients can be accumulated before entropy coding a block. Further, a multitude of wavelet filters can be used including "HAAR" filter, "Le Gall 5/3", "LeGall 10/18". Such modifications may require corresponding changes in the hardware architecture described hereinafter.

Figure 2:
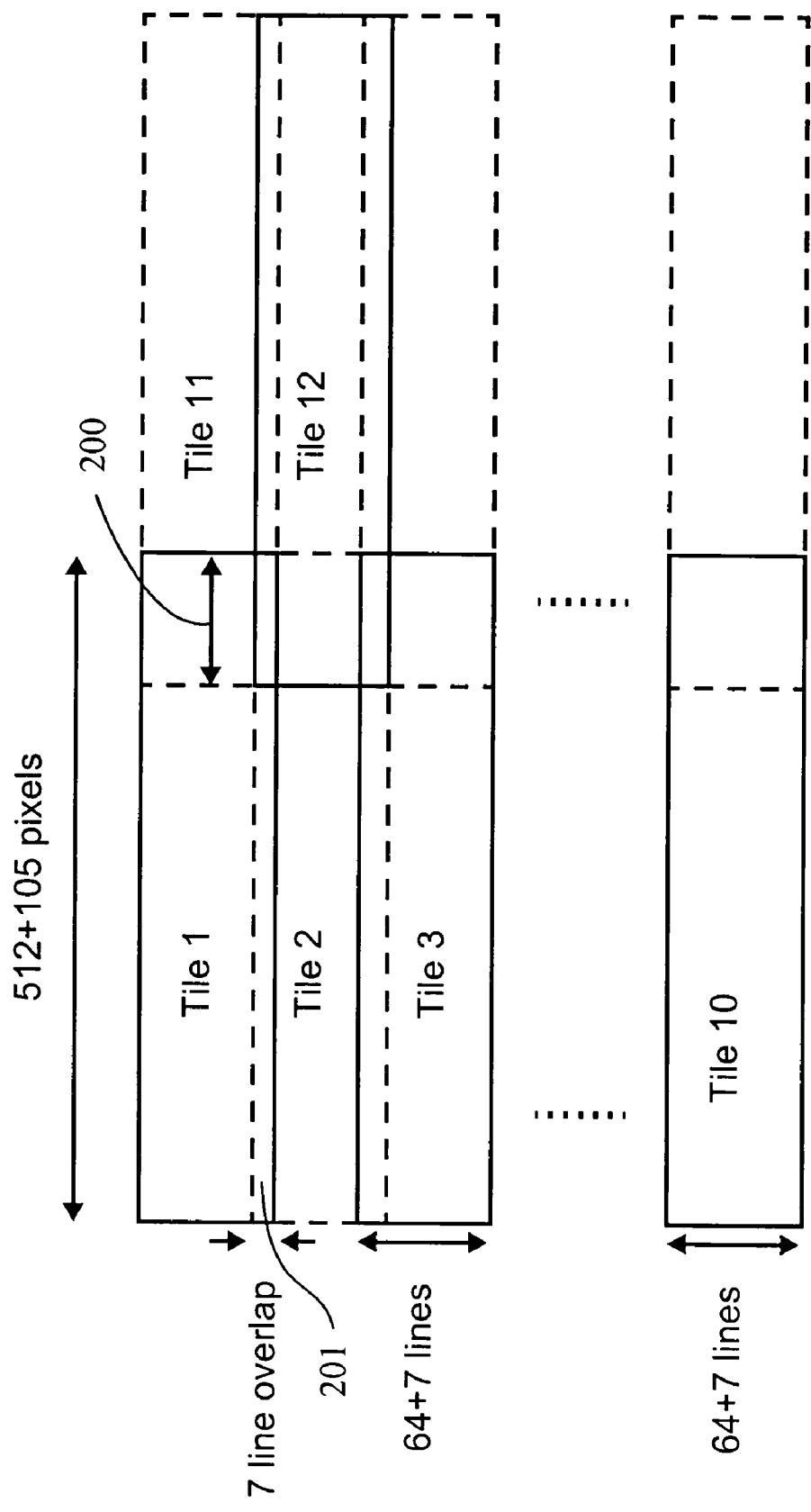
FIG. 2 represents a horizontal tiling of a image as a variation on a preferred embodiment of the present invention.
Figure 3:
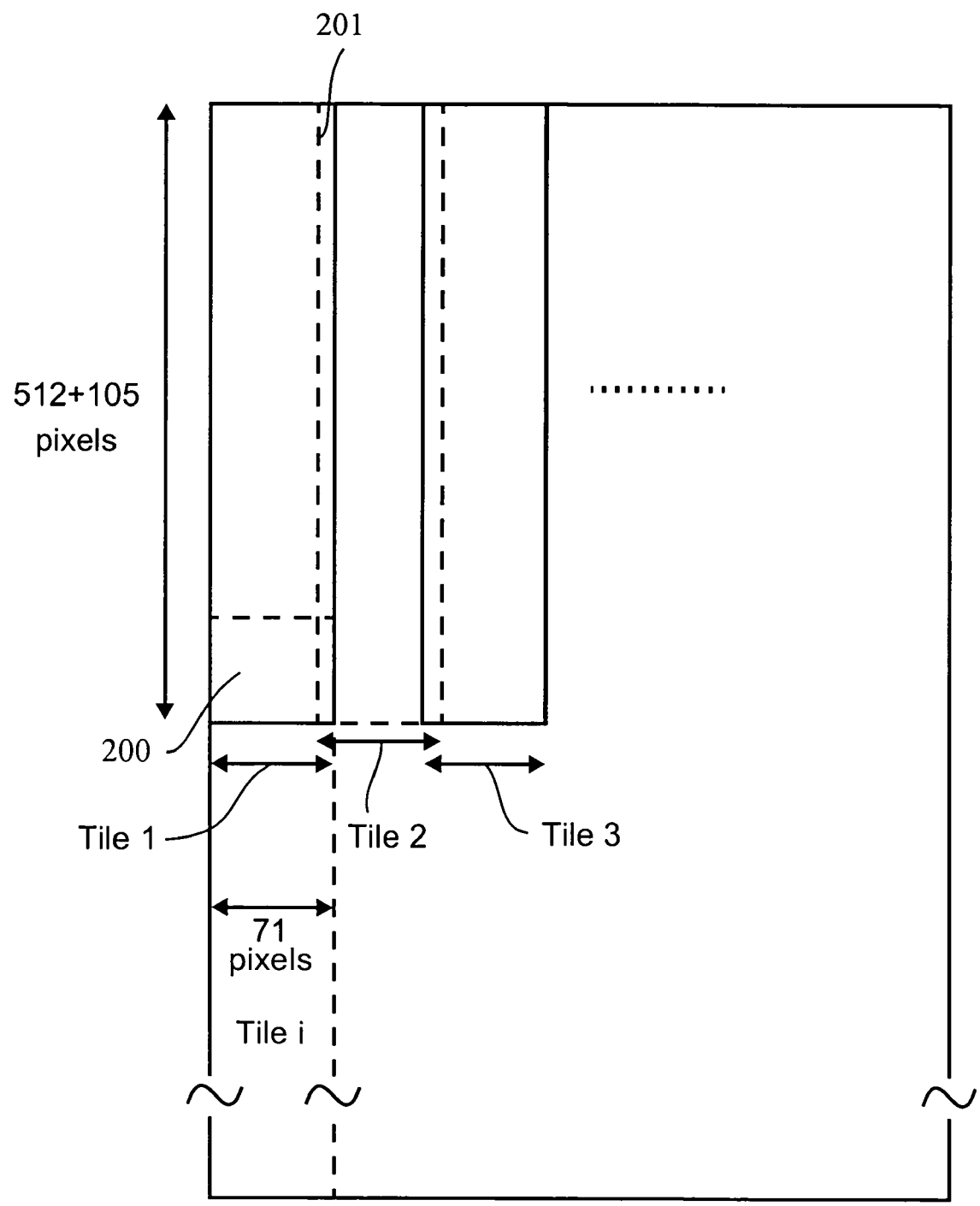
FIG. 3 represents a vertical tiling of a image in accordance with the preferred embodiment of the present invention.

Referring, now, to FIG. 2 and FIG. 3, there is shown a tiling of an image in accordance with the preferred embodiment of the present invention. That is, a sub-division of the image into a plurality of, preferably partly overlapping, tiles. The dimension of each tile being determined by fixing predetermined parameters such the level of decomposition, block size accumulated before entropy coding and, type of DWT filter used. Each tile comprises 71 pixels in one dimension by 617 pixels in the other dimension of the tile. In FIG. 2 the tiles are disposed horizontally, that is, the longest side of the tile is laid out substantially parallel to scan lines of the image. FIG. 3 shows an alternate arrangement where the tiles are disposed vertically so that the shortest side is substantially parallel to the scan lines of the image. Each tile in FIG. 2 and FIG. 3 is labelled as "Tile n", where n is a positive integer number and the labelling indicates the preferred processing order of the plurality of tiles. For example, "Tile 1" is processed before "Tile 2" which is processed before "Tile 3" and so on. Further, each tile has a predetermined overlap region 200 and 201 with an adjacent tile which is determined as described below.

In general, to produce H lines of a subband at the second level of the DWT, using the Daubechies 9/7 DWT filter, 2H+7 lines of the LL1 subband is required, which in turn requires 2(2H+7)+7=4H+14+7 lines of an image. The seven (7) lines in addition to the 2H lines is required by the Daubechies 9/7 filter and is referred to as the "overlap" 200. Preferably, the overlap is distributed as three (3) line preceding the 2H lines to be processed and four (4) lines after the 2H lines to be processed.

By mathematical induction it can be shown that, for the present filter, in one dimension to form H lines of any subband to level J requires, $$2^J H+(2^{J-1}+ \ldots +2^1+2^0)0.7=2^J H+7(2^J-1) \qquad \text{[EQ. 1]}$$

lines of an image. The second term in the above equation is the overlap required. Naturally, this applies to the other dimension as well. So for example, for a four level decomposition (J=4) using the Daubechies 9/7 filter and accumulating blocks of 32 pixels wide (horizontal) W=32, according to EQ1 would require 16×32+7×15= 512+105 width tiles, where the overlap 200 is 105 pixels. That is, the overlap 200 between "Tile 1" and "Tile 11" in FIG. 2 is 105 pixel in the horizontal direction by 71 pixel (2H+7) in the vertical.

Transforming 2H+7 lines at a time, and progressing to a next (overlapped) tile, in increasing label order, produces H lines from each of the HL1, LH1 and HH1 subbands. These subband portions can be coded as soon as W (in our example W=32 pixels) such pixels (by H lines)—that is for every 2H pixel columns input, just as was the case above. At the end of processing the first pass (i.e. one tile at one level decomposition) of a tile, H lines by $2^{J-1}W+7(2^{J-1}-1)$ coefficients per line of the LL1 subband needed to be buffered. This number of coefficients per line in the LL1 subband, is required, in order to form a W width block(s) at the top level (level J). Referring to FIG. 2, when tile "Tile 1" is processed then "Tile 2" is processed in substantially the same manner. That is, process another $(2H+7)\times(2^J W+7(2^J-1))$ pixel tile of the image. Now, having processed "Tile 2" another H lines of the LL1 subband are generated, with a total of 2H lines after processing two tiles. To further decompose LL1 subband to produce H lines of a LL2 subband 2H+7 lines of the LL1 subband are required. Since processing "Tile 2" has thus far produced 2H lines a third such tile "Tile 3" needs to be processed providing a total of 3H lines which provides the 2H+7 line required to perform the next level decomposition to recover H lines of a LL2 subband. Similarly, continuing in this manner to a processing of at least $2^J H+7$ $(2^J-1)$ lines will produce H lines of coefficient at the J th level of decomposition. Recall that a line is $2^{J-1}W+7$ $(2^{J-1}-1)$ pixels (or DWT coefficients long) and not necessarily the width or length of the image. At each iteration to obtain a next level decomposition the resultant coefficients of the LL frequency subband at a current level are buffered whilst each H×W block of higher frequency generated (ie LH, HL, HH) at the current level is sent to an entropy encoder for coding.

Output devices, in general, and display devices in particular, display images in raster scan order, from left to right and top to bottom. Thus, the preferred implementation of the present embodiment is that of the tile arrangement shown in FIG. 3. The overlapping tiles are preferably arranged so that the shortest dimension of the tile is parallel to the scan lines of the image. Preferably, the tiles are processed across the width of the image, before a next row of tiles are processed. This arrangement is preferred so the tiles can be processed from left to right and top to bottom (ie raster scan type order), however other orientation can be used without departing from the scope and spirit of the invention. For example the tile arrangement of FIG. 2 is an alternate arrangement to that of FIG. 3.

In the arrangement of FIG. 3 each tile is of size $(2^J H+7$ $(2^J-1))\times(2W+7)$ pixels and processed in raster scan order. For a J=4 level DWT decomposition and to attain H=32 by W=32 coefficient blocks sizes for entropy coding, each tile of the image has dimensions 512+105=617 lines by 2×32+7=71 coefficients (or pixel) per tile line.

Figure 4:
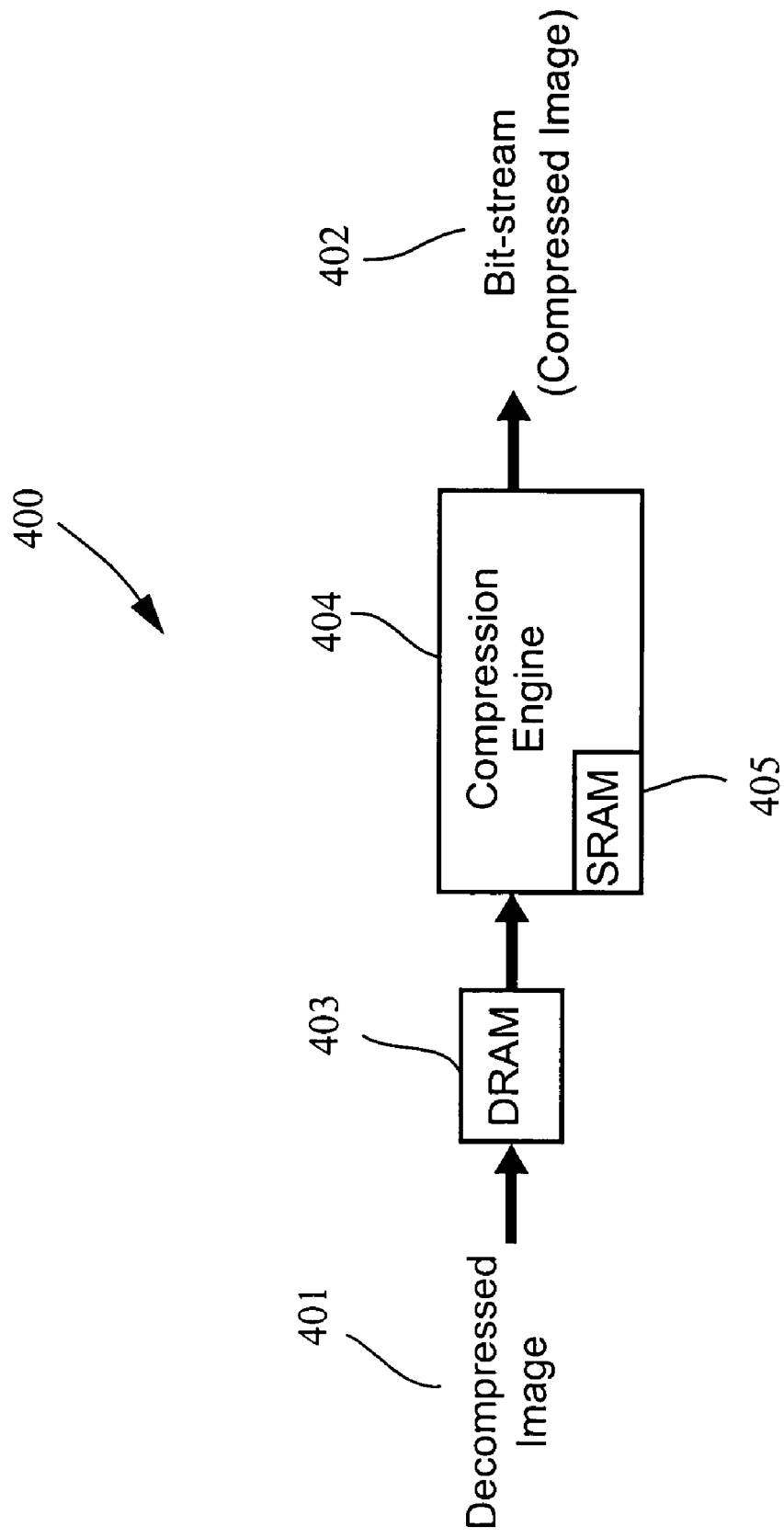
FIG. 4 illustrates the encoder of the preferred embodiment of the present invention.

Referring to FIG. 4, there is shown a block diagram of the encoder 400, which takes an uncompressed image 401 and produces a compressed bit stream 402 representing the image. The encoder 400 comprises a predetermined amount of external memory 403, preferably dynamic random access memory DRAM, and a compression engine 404 which itself includes a predetermined amount of internal memory 405, typically static random access memory SRAM. The encoder 400 and in particular the compression engine 404 performs the necessary steps to produce a compressed image bit stream 402 from an uncompressed image 401 and includes performing a linear transform (DWT), and entropy coding the transform coefficients. Further, the compression engine 404 is preferably implemented as a single chip which uses a master pixel clock signal, clk, throughout the chip.

The Uncompressed image 401 is buffered through the external DRAM of the encoder 400 and is controlled by the compression engine 404. The external DRAM is preferably used to buffer a portion of the uncompressed image substantially corresponding to a tile as hereinbefore described (617×71 pixel or coefficients). The compression engine read short bursts of data corresponding to 71 pixels or coefficients along each line, scanning down the tile in zig-zag order.

Figure 5:
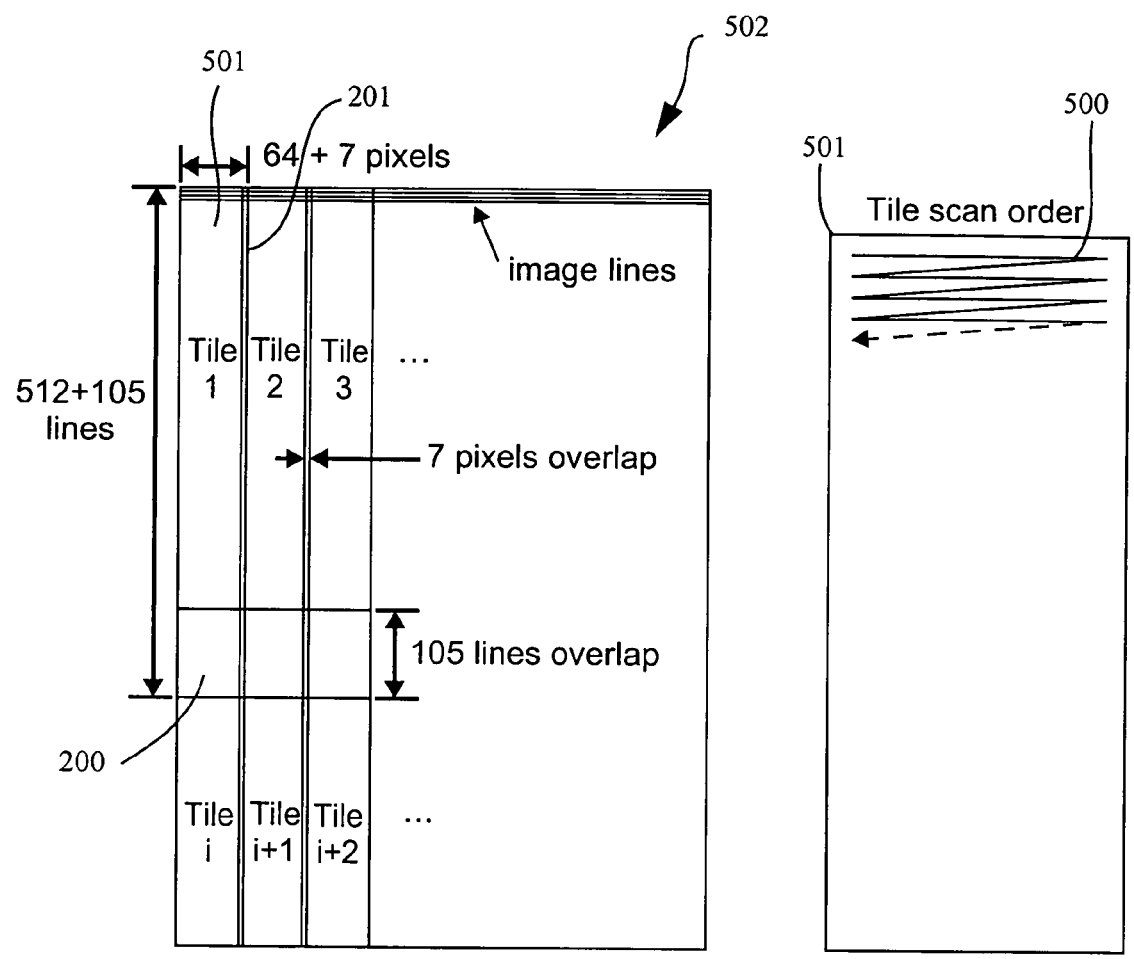
FIG. 5 shows the tiling of FIG. 3 and a preferred tile scan order.

FIG. 5 shows the zig-zag order 500 in which each tile is scanned and a more detailed illustration of the tile arrangement of FIG. 3 for a portion of an image 502. As previously described the width of a tile is 2W+7 which for a desired block width of W=32 results in a tile width (or the length of a line in a tile) of 71 pixels (ie. 64+7, seven being the horizontal overlap 201). Thus the compression engine 404 preferably reads one line of a tile at a time working in zig-zag order until 617 lines or $(2^J H+7(2^J-1))$, where H=32, lines are read. That is, the portion of the previous expression constitutes a vertical dimension of an overlap region 200 between adjacent tiles. For example, for a four level DWT the overlap region 200 is 105 pixels in length by the width (71 pixels) of a tile. As each 32×32 (H×W) transformed block of higher frequency components (LH, HL, HH) is generated the block is entropy code without intermediate buffering. Thus in the preferred embodiment the overlap region 201 between two adjacent tiles (eg. "tile 1" and "tile 2") in a horizontal direction is substantially seven (7) pixels wide by the length of a tile and the overlap region 200 two adjacent tiles (ie. "tile 1" and "tile i") in a vertical direction is substantially one hundred and five (105) pixels long by the width of a tile.

Figure 6:
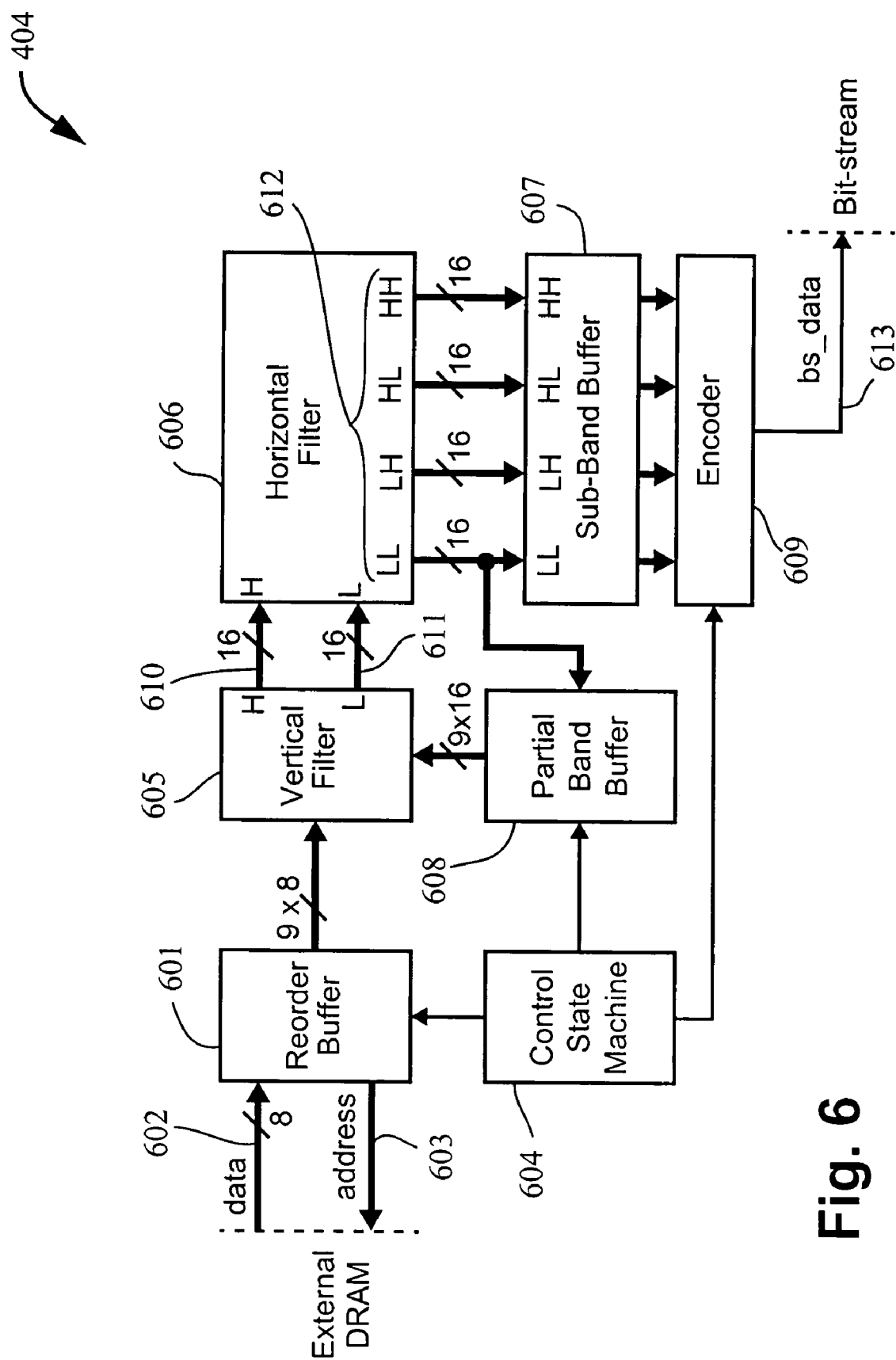
FIG. 6 shows the compression engine of FIG. 4 in more detail.

Referring now to FIG. 6 there is shown the compression engine 404 of FIG. 4 in more detail. The compression engine 404 comprises: a reorder buffer module 601 which receives 602 data from the external DRAM 403 in response to a memory address transmitted to the DRAM via an address bus 603; a control state machine module 604; a vertical filter 605; a horizontal filter module 606; a subband buffer 607, a partial band buffer 608; and an entropy encoder unit 609.

The Reorder Buffer module 601 controls the reading and writing to the external DRAM 403 and also includes a small memory buffer to assemble the data received from the DRAM 403 so that it can be read out to the vertical filter 605 in a predetermined order. The reorder buffer module 601 passes nine bytes (72 bits) of data, at a time, to the vertical filter module 605. The vertical filter module 605 performs a low pass and high pass filtering in a first dimension (the vertical dimension of the tile of FIG. 3). There are two outputs, 611 and 610, from the vertical filter module 605, corresponding to low pass and high pass filtering of the data. Each output 610 and 611 passes to separate horizontal filters in the Horizontal Filter module 606 where an identical filtering operation is performed in a second dimension (the horizontal dimension of the tile of FIG. 3). The Horizontal Filter module 606 provides four output signals corresponding to a LL, LH, HL and HH subband signal. The subband signals comprising high frequency components (ie LH, HL and HH) are temporarily buffered in the Sub-Band Buffer module 607 before being encoding by the entropy encoder module 609 to produce an encoded bit-stream output on 613. The LL subband signal is passed to the Partial Band Buffer 608 where it is assembled into larger blocks which are then passed back into the vertical filter module 605 for subsequent transform levels. Only at a final level (eg level 4) is the LL subband signal encoded into the output bit stream (via output 613). The Control State Machine module 604 oversees operation of the compression engine 404, making sure that appropriate data are stored in the correct places, and that operations are done on the correct data at the right times.

Figure 7:
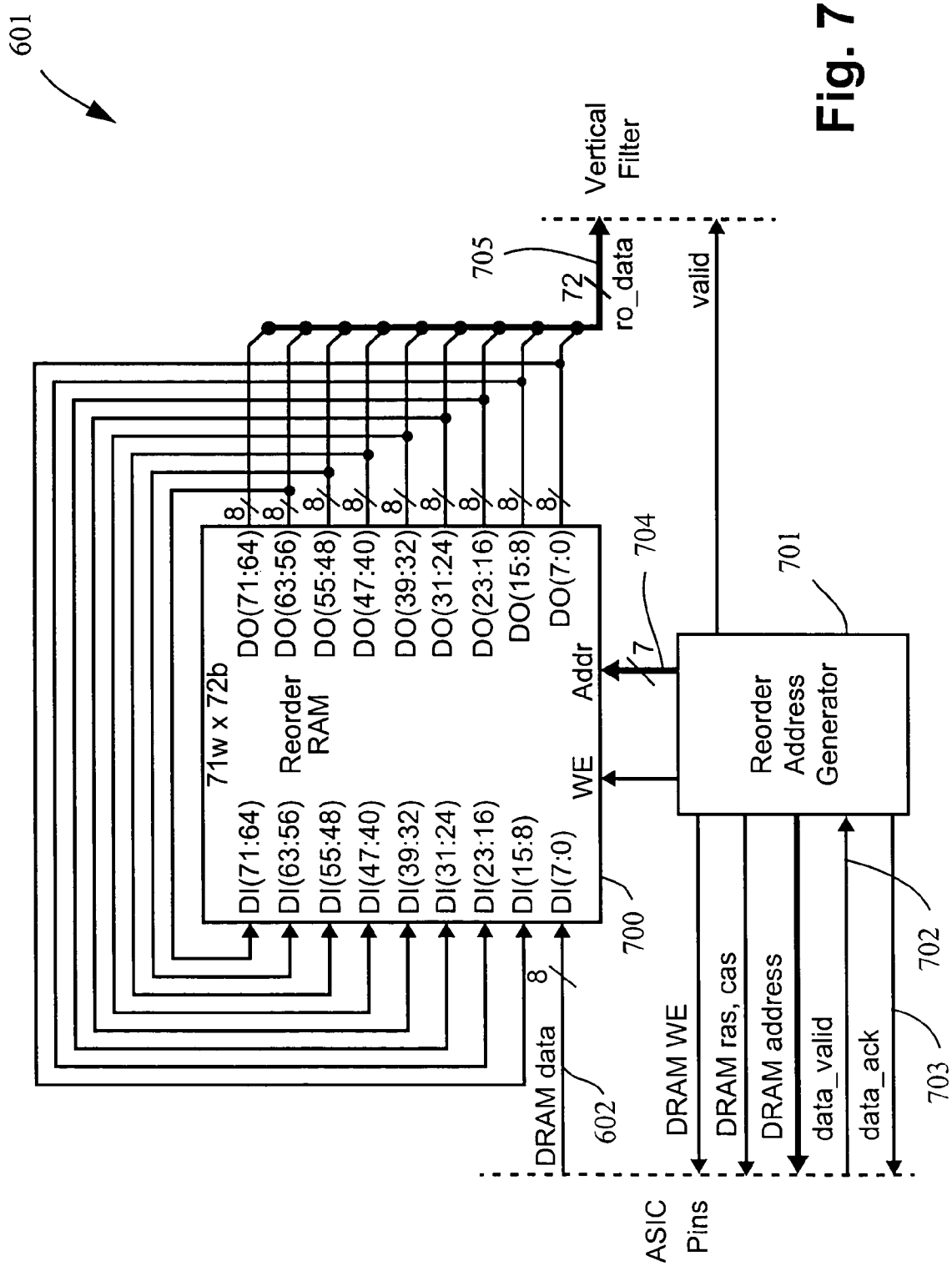
FIG. 7 illustrates a reorder buffer in accordance with the preferred embodiment of the present invention.

Turning to FIG. 7, where the Reorder Buffer Module 601 of FIG. 6 is shown in more detail. The Reorder Buffer Module 601 includes random access memory (hereinafter Reorder RAM) 700 to store intermediate raw data received 602 from external memory 403 and a Reorder Address Generator sub-module 701 which includes a DRAM controller for controlling the external DRAM 403. A data_valid 702 is a signal received from an external device supplying (raw) pixel data 401 to the DRAM 403 indicating that the current data on the DRAM data pins is valid. A data_ack signal 703 acknowledges that the data has been read into the DRAM 403. The external DRAM 403 takes its input directly from the external raw pixel supply (not shown). The Reorder Address Generator 701 determines and supplies 704 addresses to the Reorder RAM 700 as well as controlling writes into that RAM.

The Data Out (DO) pins from the Reorder RAM 700 are connected to the Data In (DI) pins of the same Reorder RAM

700 with a shift of 8 bits. That is the DO(n+7:n) pin is connected to the DI(n+15:n+8) pin, where n represents the lower bit number. For example, DO(7:0) pin representing eight least significant bits of a 72 bit word Data Out is connected to DI(15:8) pin corresponding to a second eight least significant bits of a 72 bit word Data In. The data is written into the reorder RAM 700 using a read-modify-write scheme. An eight least significant bits of a 72 bit word Data In, that is, the byte input to the DI(7:0) pin comes from external DRAM 403 while the rest of the input data word comes from the Reorder RAM 700 outputs in the shifted fashion described above. The Reorder RAM thus acts like a big byte-wide addressable shift register, 9 words deep and 71 words wide. Data is read from the external DRAM in bursts of 71 words along a scan line of the image (ie a line of a tile). Two lines (71 bytes×2) of image data are written into the Reorder RAM 700 for each row (lines) of samples that are used by the Vertical Filter Module 605. This constitutes or provides a down sampling (decimation by two) of the image data in the vertical direction as required by the DWT.

As previously described the re-order data from the Reorder RAM 700 is passed, via a ro_data bus 705, on to the Vertical Filter Module 605 nine (9) bytes at a time (72 bits).

Figure 8:
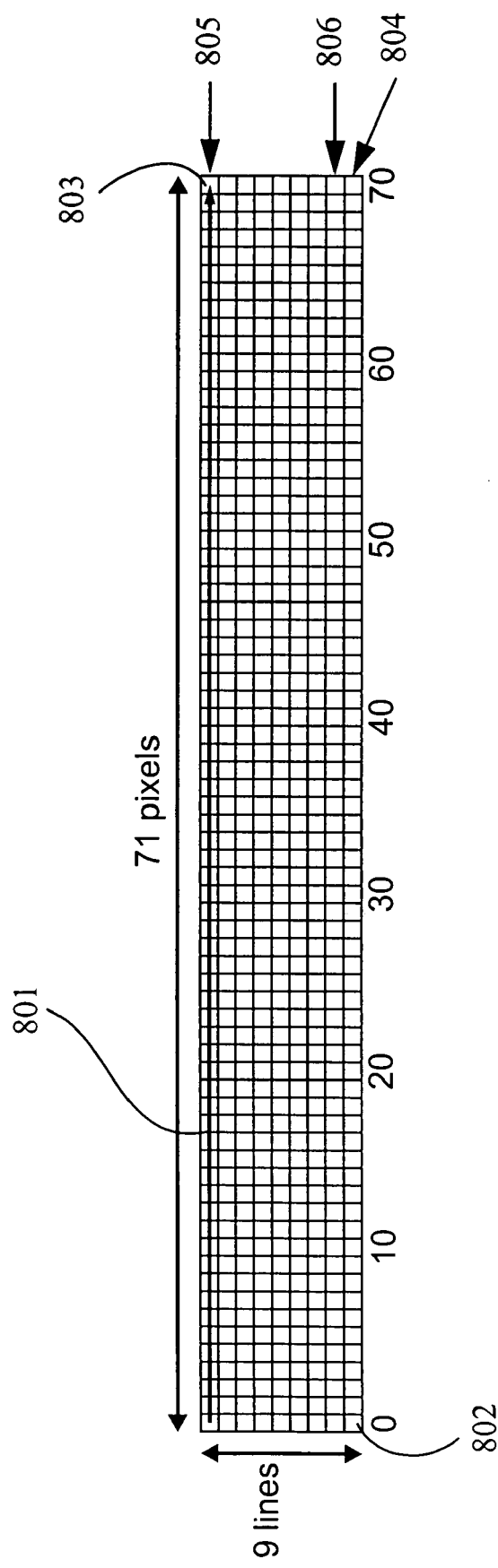
FIG. 8 represents a fill order of the reorder buffer of FIG. 7.

FIG. 8 is a representation of the organisation of the Reorder Buffer 601 of FIG. 7. The Reorder Buffer 601 of the preferred embodiment is 71 pixels wide and 9 lines high. The buffer 601 is written from left to right as indicated by the arrow 801 in FIG. 7. As each line is written from left to right, pixels are pushed down the lines, one at a time. That is, when nine lines of the buffer have been written, (9×71=) 639 pixels will occupy the buffer and a first pixel of the 639 pixels to enter the buffer resides at cell 802 of the buffer at a first position of the ninth line 804 of the buffer, whilst a last pixel of the 639 pixels to enter the buffer resides at cell 803 of the buffer on the first line 805. The memory 700 (Reorder RAM) is organised as 71 words of 72 bits where the 72 bits represent 9 pixels in the vertical dimension. After 9 lines have been written to the same 71 addresses repeatedly (8 bits at a time), the entire buffer 601 is full. As a last 71 bytes (pixels), of the 639 pixels, is written into the top line, the data is read out during the read-modify-write cycles (all 72 bits) is used to load the Vertical Filter Module 605. Once the buffer 601 has been filled, data is used by the Vertical Filter Module 605 from every second line of image data loaded into the Reorder Buffer 601, which in effect performs a sub-sampling in a vertical direction.

The sub-sampling in a vertical direction is achieved as follows. Initially, the Vertical Filter Module 605 processes nine lines of the reorder buffer with a first tap of the 9 tap filter arranged to use data from the last line 805 of the reorder buffer while a last tap of the filter uses the data from the first line 804, of the reorder buffer 601, to produce, for example, a line of low pass filtered data which may be stored in the partial band buffer 608. Naturally, taps intermediate the first and last tap use data from corresponding lines of the reorder buffer 601. Next, each line of data the reorder buffer 601 is "pushed down" the buffer so that the last line 804 of the reorder buffer 601 is in effect deleted (pushed off the buffer) and the data from each preceding line is written into a subsequent line of the reorder buffer 601. That is, data from the 8th line 806 of the buffer is written into the 9th line 804, data from the 7th line of the buffer is written into the 8th line 806, data from the 6th line is written into the 7th line and so on. On the first line 805 of the reorder buffer 601 a new line of data is inputted from external DRAM 403. This push done is repeated for every line inputted into the reorder buffer 601. Thus sub-sampling in the vertical direction is performed by reading out and processing nine lines of the reorder buffer after every second line of data is inputted into the reorder buffer 601. The reorder buffer is completely refilled at the start of a tile and the above described process is repeated preferably until the entire image is processed.

After substantially 71 lines of the image have been retrieved from the external memory 403 and transferred to the Reorder Buffer 601, the Sub-Band Buffer 607 contains sufficient transform coefficients for encoding to commence. In the implementation according to the preferred embodiment the Sub-Band Buffer 607 becomes full and the coefficients need to be encoded before the Reorder Buffer 601 can be further updated. While higher level coefficients are being filtered, new data can be loaded into the Reorder Buffer in preparation for the next level one filter operation.

The Reorder Address Generator 701 simply cycles from 0 to 70 for the Reorder Buffer 601, but addresses the external DRAM 403 in zig-zag order, as hereinbefore described with reference to FIG. 5, during reads. The Reorder Address Generator 701 also controls the raster scan order during writes of the image into the external DRAM 403. The external DRAM 403 is preferably large enough to store at least 617 full-width lines of image. In practice, good bandwidth can be realised from a dual port DRAM, or optionally a Video Random Access Memory (VRAM) can be used for the external memory 403.

Figure 9:
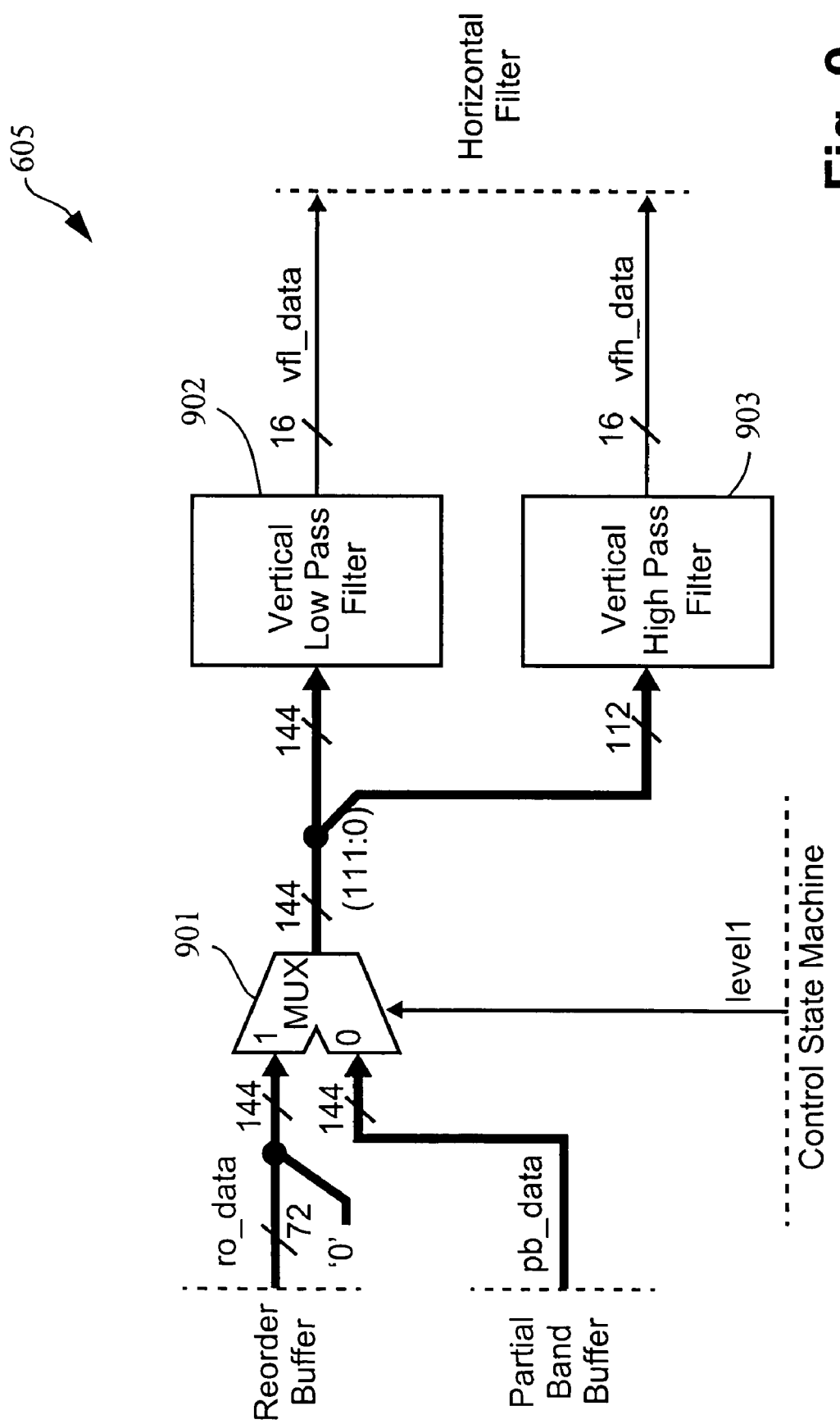
FIG. 9 illustrates a vertical filter hardware arrangement in accordance with the pre-ferred embodiment of the present invention.

FIG. 9 represents the Vertical Filter Module 605 of FIG. 6 in more detail. The Vertical Filter Module 605 includes a multiplexer 901 to select either data from the Reorder Buffer 601 when doing a level one decomposition or data from the Partial Band Buffer 608 during subsequent decomposition levels. The 9 bytes×8 bits of data received from the Reorder Buffer 601 is converted into 9 words of 16 bits to be compatible with the data from the Partial Band Buffer 608 by zeroing the unused bits. The multiplexer 901 is controlled by the control state machine module 604. Typically, eight bit colour channel per pixel data is converted to sixteen bit precision DWT coefficient so that a minimal amount of information is lost due to rounding effect on the coefficient values.

In addition the Vertical Filter Module 605 includes a Vertical Low Pass Filter 902 and a Vertical High Pass Filter 903 which receive data in accordance with the selection of the multiplexer 901. The Vertical Low Pass Filter 902 takes 9×16 bit samples and performs a matrix operation (multiply-accumulate) on the data, producing a 16-bit result (vfl_data) from every 9 words of input. The Vertical High Pass Filter 903 only requires 7×16 bit samples to perform its matrix operation, again producing 16 bits of result (vfh_data). As previously described the filters of the present embodiment are based on the Daubechies 9/7 DWT, however other wavelet filters can be used.

Figure 10:
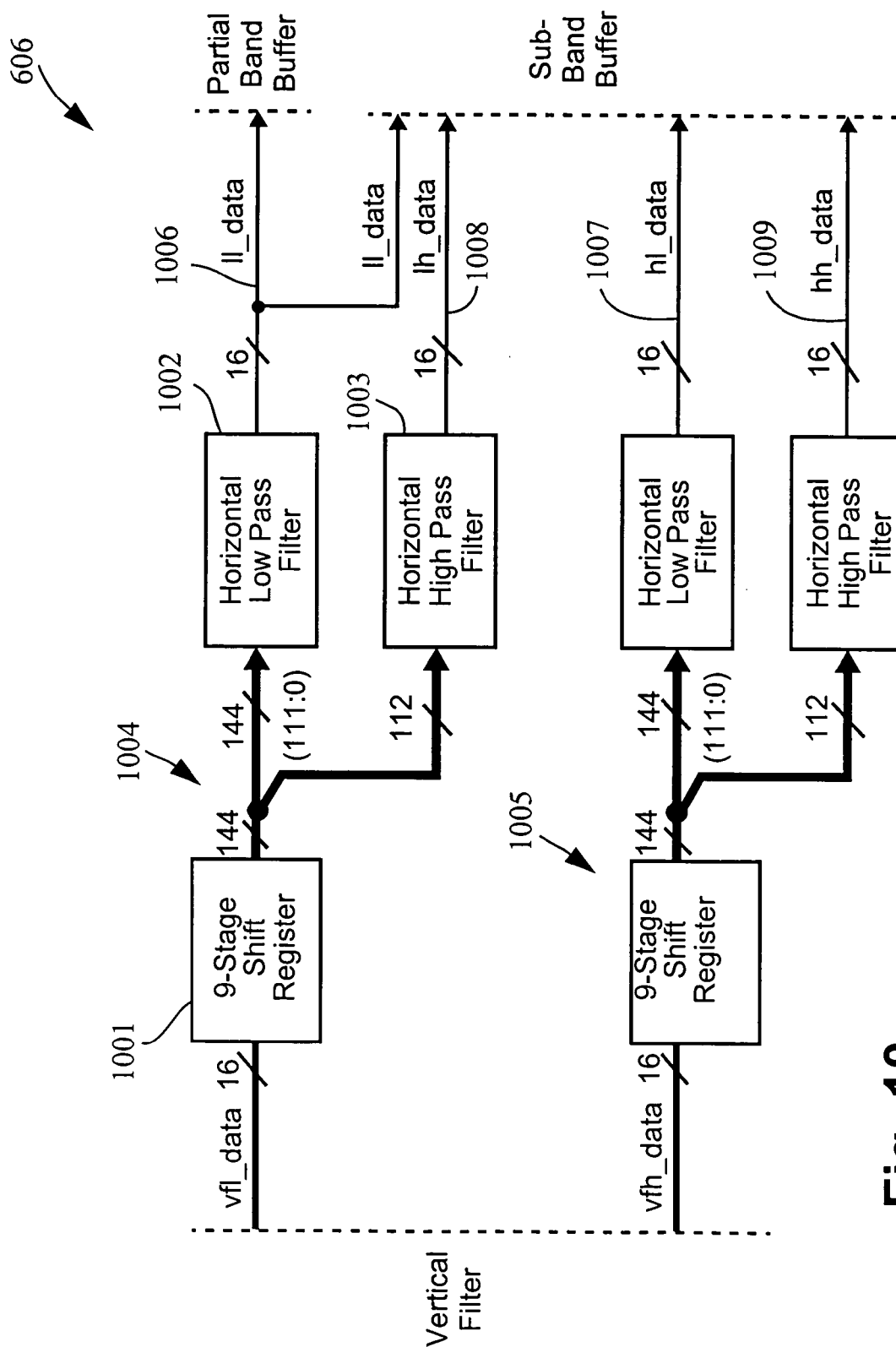
FIG. 10 illustrates a horizontal filter hardware arrangement in accordance with the preferred embodiment of the present invention.

FIG. 10 is the Horizontal Filter Module 606, of FIG. 6, in more detail. The Horizontal Filter Module 606 comprises two substantially identical sections 1004 and 1005 which process data from the Vertical Filter Module 605. Each section comprises a 9-Stage Shift Register 1001, a Horizontal Low Pass Filter 1002 and a Horizontal High Pass Filter 1003. Data first passes through a pair of 9-Stage Shift Registers which buffer up to nine (9) consecutive samples received from the Vertical Filter Module 605 to be processed simultaneously. Whilst the two sections 1004 and 1005 process the data in substantially the same manner, the source of the data for each section is different. One section 1004 receives the vertical low pass filter signal vfl_data, while the other section 1005 receives the vertical high pass filter signal vfh_data.

The Horizontal Low Pass Filter 1002 of each section take 9×16 bit samples and perform a matrix operation (multiply-accumulate) on the data, producing a 16-bit result each from every 9 words of input, producing a ll_data signal 1006 and a hl_data signal 1007 for section 1004 and 1005 respectively. The Horizontal High Pass Filter 1003 of each section only requires 7×16 bit samples to perform a matrix operation, again each High Pass Filter 1003 producing 16 bit result. The Horizontal High Pass Filter for section 1004 provides signal lh_data 1008 and the Horizontal High Pass Filter for section 1005 provides signal hh_data 1009. The resultant subband data, that is signals ll_data, lh_data, hl_data and hh_data corresponding to coefficients of the LL, LH, HL and HH subbands are passed on to the Sub-Band Buffer module 607.

After processing 9 word samples both 9-stage shift registers shift the data by two to account for sub-sampling (decimation by two) in the horizontal direction.

The ll_data 1006, corresponding to coefficients of the LL subband at the current level of DWT decomposition, is also sent to the Partial Band Buffer module 608 for sub-sequent levels of decomposition.

Figure 11:
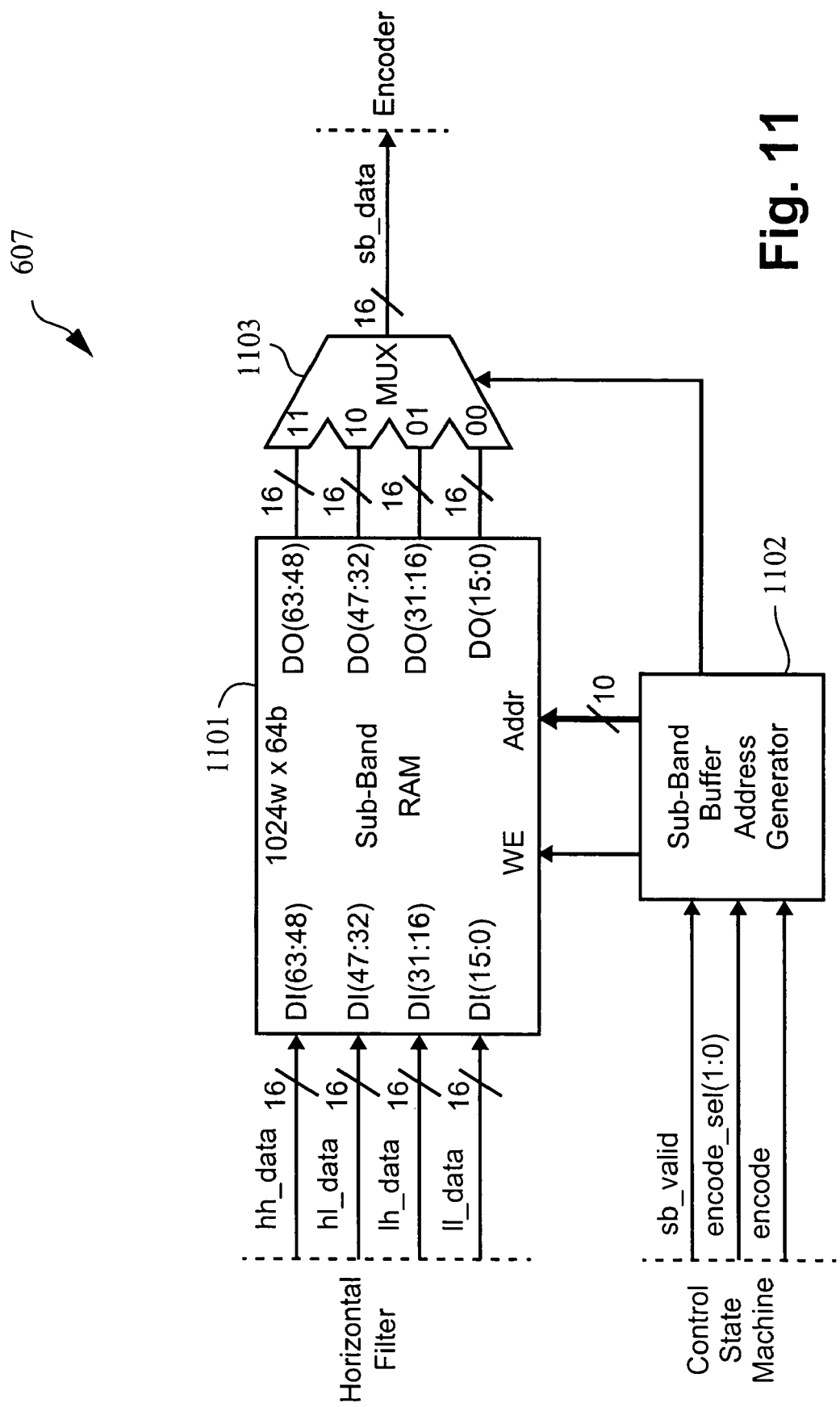
FIG. 11 illustrates a subband buffer hardware arrangement in accordance with the preferred embodiment of the present invention.

The Sub-Band Buffer Module 607 of FIG. 6 is shown in greater detail in FIG. 11. The Sub-Band Buffer 607 includes: a predetermined amount of random access memory (RAM) 1101 to store a predetermined number of coefficients from each of the LL, LH, HL and HH subbands; a Sub-Band Buffer Address Generator sub-module 1102 and a multiplexer 1103. The Sub-Band Buffer Address Generator 1102 supplies addresses to the Sub-Band RAM 1101 as well as controlling writes into that RAM under the control of the Control State Machine module 604.

The multiplexer 1103 selects data, coefficients, from one of the four subbands for encoding by the Entropy Encoder Unit 609.

Figure 12:
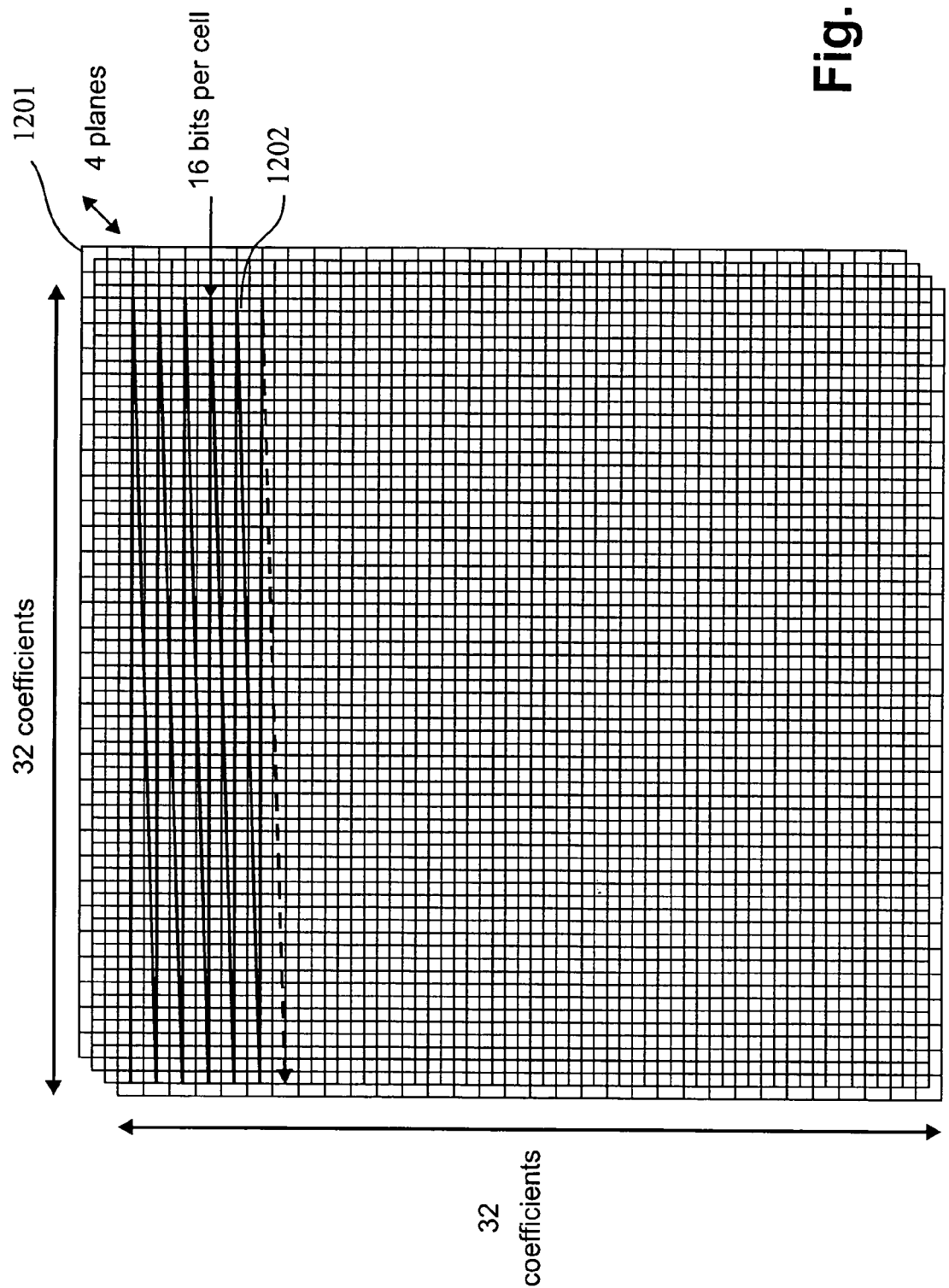
FIG. 12 represents a fill and scan order of the subband buffer of FIG. 11.

Referring to FIG. 12 there is shown a representation of a data arrangement or organisation of the Sub-Band Buffer of FIG. 11. The Subband Buffer holds four (4) banks 1201 of thirty two (32) by thirty two (32) coefficients and each coefficient is represented by a sixteen (16) bit value. Thus, the Sub-Band RAM is a total of 64 Kbits and is organised as 1024 words of 64 bits, storing one coefficient from each subband at each memory location in parallel. That is, four coefficients, one from each subband at a current level, are represented each as sixteen (16) bits of a sixty four (64) bit word. The buffer 1101, and in particular each bank 1201, is filled in raster scan order from top to bottom as indicated by the zig-zag pattern 1202 shown in FIG. 12. During encoding at the Entropy Encoding Unit 609, the Subband RAM 1101 is read out in quadtree manner.

Figure 13:
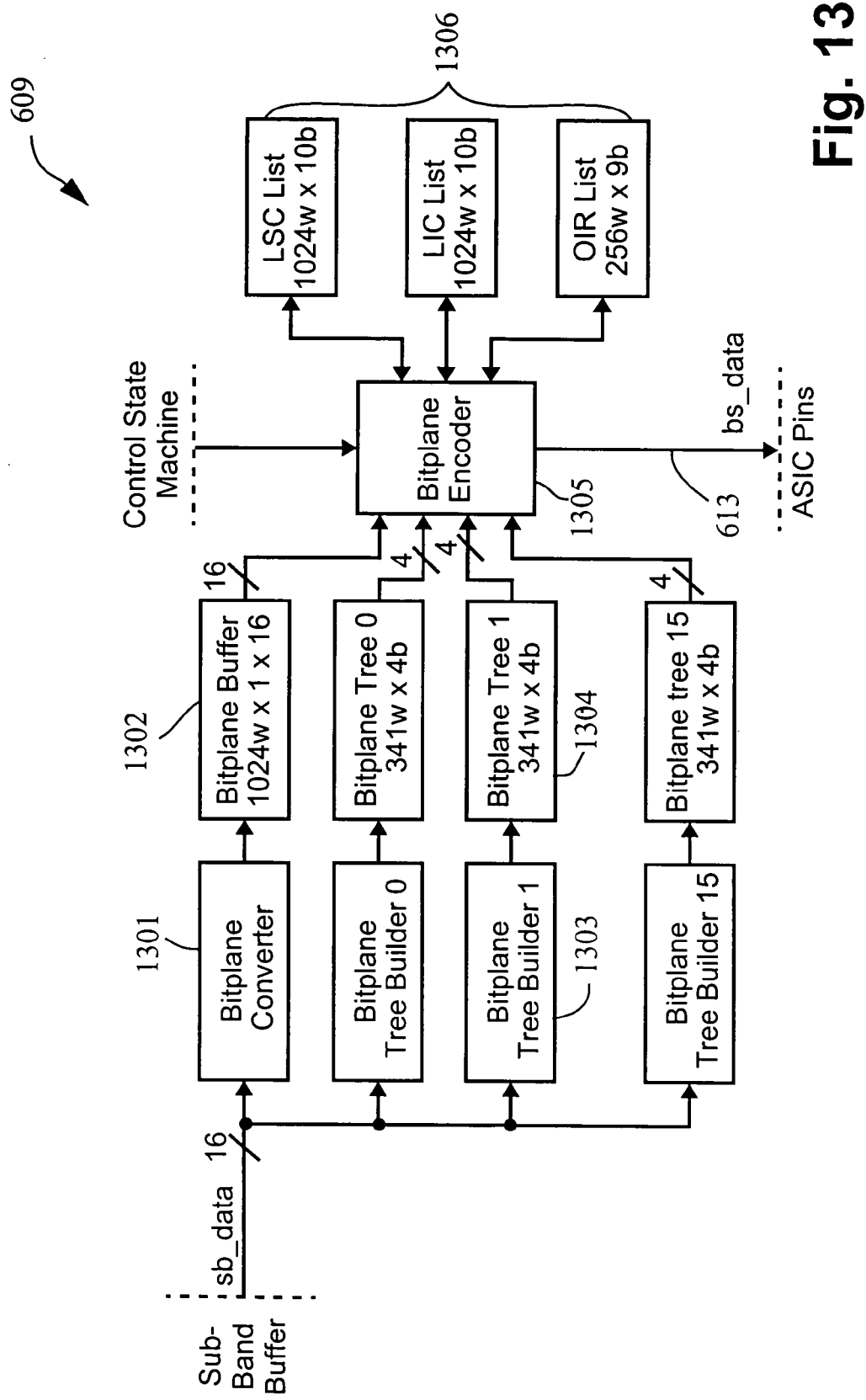
FIG. 13 illustrates a control state machine hardware arrangement in accordance with the preferred embodiment of the present invention.

Referring to FIG. 13 there is shown the Entropy Encoder unit 609 of FIG. 6 in more detail. The Entropy Encoder unit 609 comprises a Bitplane Converter module 1301 and Bitplane Buffer sub-module 1302 comprising sixteen (16) bitplane memories; a plurality of Bitplane Tree Builder units 1303 and corresponding Bitplane Tree buffer units 1304; a Bitplane Encoder 1305; and a plurality of intermediate buffers 1306 for intermediate storage of data use by the Bitplane Encoder 1305. The data stored in Sub-band RAM 1101 is read in quadtree order from the Subband Buffer module 607. The bitplane converter module 1301 splits up each bit plane's data and writes into each of 16 bitplane memories in the Bitplane Buffer submodule 1302. The data is also scanned by the plurality Bitplane Tree Builders which write processed bit plane tree structure information into corresponding Bitplane Tree buffers 1304. Data from each Bitplane Tree 1304 and the Bitplane Buffer 1302 is used by the Bitplane Encoder 1305 to perform a bit-stream generation which is output (via bus 613). The Bitplane Encoder 1305 is synchronised (controlled) by the control state machine module 604. The intermediate buffers 1306 comprise: a buffer for temporarily storing a List of Significant Coefficients (LSC); a buffer for temporarily storing a List of Insignificant Coefficients (LIC); and a buffer for temporarily storing an Old Insignificant Region (OIR) list which can also be implemented as two buffers as a first list of regions buffer and a second list of region buffer (not shown in FIG. 13). In addition the Entropy Encoder Unit 609 includes a sign bit buffer (not shown in FIG. 13) which is connected to the output of the Bitplane Converter module 1301 and to an input to the Bit-plane Encoder 1305 which also encodes a sign bit into the bit-stream. An example of an Entropy Encoder unit is described in more detail later in this specification, under a heading "Entropy Encoder".

The preferred embodiment of the present invention is described with reference to an Entropy Encoding Unit which performs a quadtree bitplane encoding as described above, however other entropy encoders can be used without departing from the scope or spirit of the invention. For example, a bitplane Arithmetic coder can be used to encode the transform coefficients, or optionally a hybrid encoder performing part quadtree encoding and part Arithmetic coding of the DWT coefficients.

Figure 14:
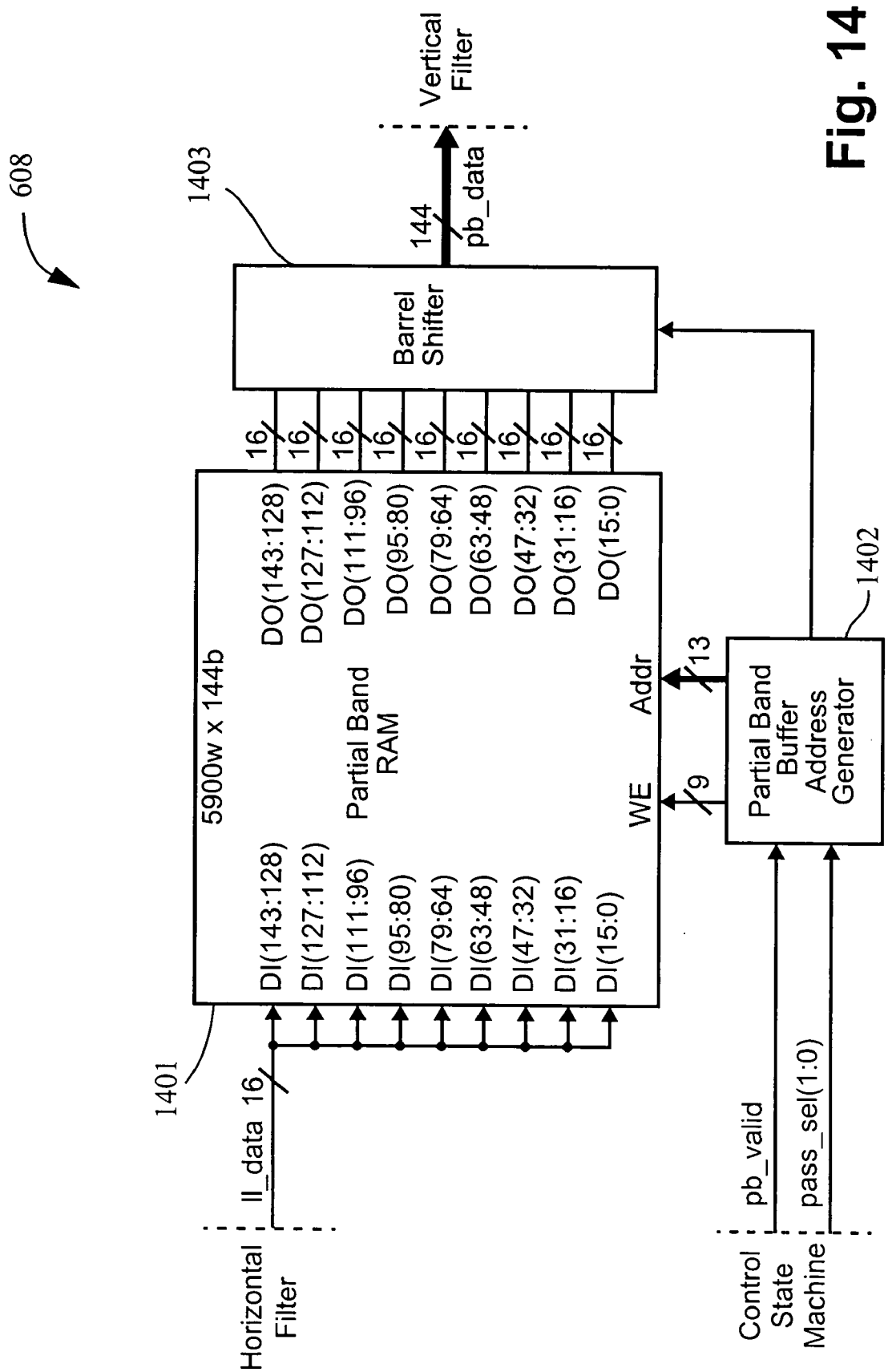
FIG. 14 illustrates a partial band buffer hardware arrangement in accordance with the preferred embodiment of the present invention.

Referring to FIG. 14 there is illustrated in more detail the Partial Band Buffer module of FIG. 6. The Partial Band Buffer Module 608 includes: RAM 1401 to store the LL subband data (i.e. ll_data 1006 generated by the Horizontal Filter Module 606 of FIG. 6) for each level of decomposition; a Partial Band Buffer Address Generator submodule 1402 and a barrel shift register (barrel shifter) 1403. The Partial Band Buffer Address Generator 1402 supplies addresses to the Partial Band RAM 1401 as well as controlling writes into that RAM under the control of the Control State Machine module 604.

The Partial Band Buffer holds LL subband data from each level of compression until enough samples are available to filter to a next level of decomposition. Once enough samples are available at any one level, the data is read out through the barrel shifter 1403 into the Vertical Filter module 605 to filter to a next level of decomposition. Conceptually, the RAM 1401 comprises three separate buffers, each one being one hundred (100) cells wide with each cell capable of storing a 16 bit value. A first buffer, of the three separate buffers, is 305 rows (lines) deep, a second buffer is 149 rows deep and a third buffer is 71 rows deep to a total of 525 rows (lines). However, since Vertical Filter module 605 takes nine (9) values as required by the Daubechies 9/7 filter, it is desirable that the total number of rows (lines) is a multiple of nine (9). Thus, an extra 6 rows of cells are appended to the buffers resulting in a total of 531 rows (ie 59 multiple of 9). For the present embodiment this result in a memory size of at least 59×100×144=531×100×16 bits or approximately 0.81 Megabits.

The Barrel Shift register 1403 allows single clock alignment of data to the desired row required by the Vertical Filter module 605. Predetermined memory locations need to be read from the Partial Band RAM 1401 to produce a single word for the Vertical Filter 605. If the required single word wraps across a 9-line boundary, two adjacent memory location need to be read. This will typically occur in 8 out of every 9 line sets (each set comprising nine lines). In this case data is latched inside the Barrel Shifter 1403 until both words are read and all required bits are available and properly aligned.

Figure 15:
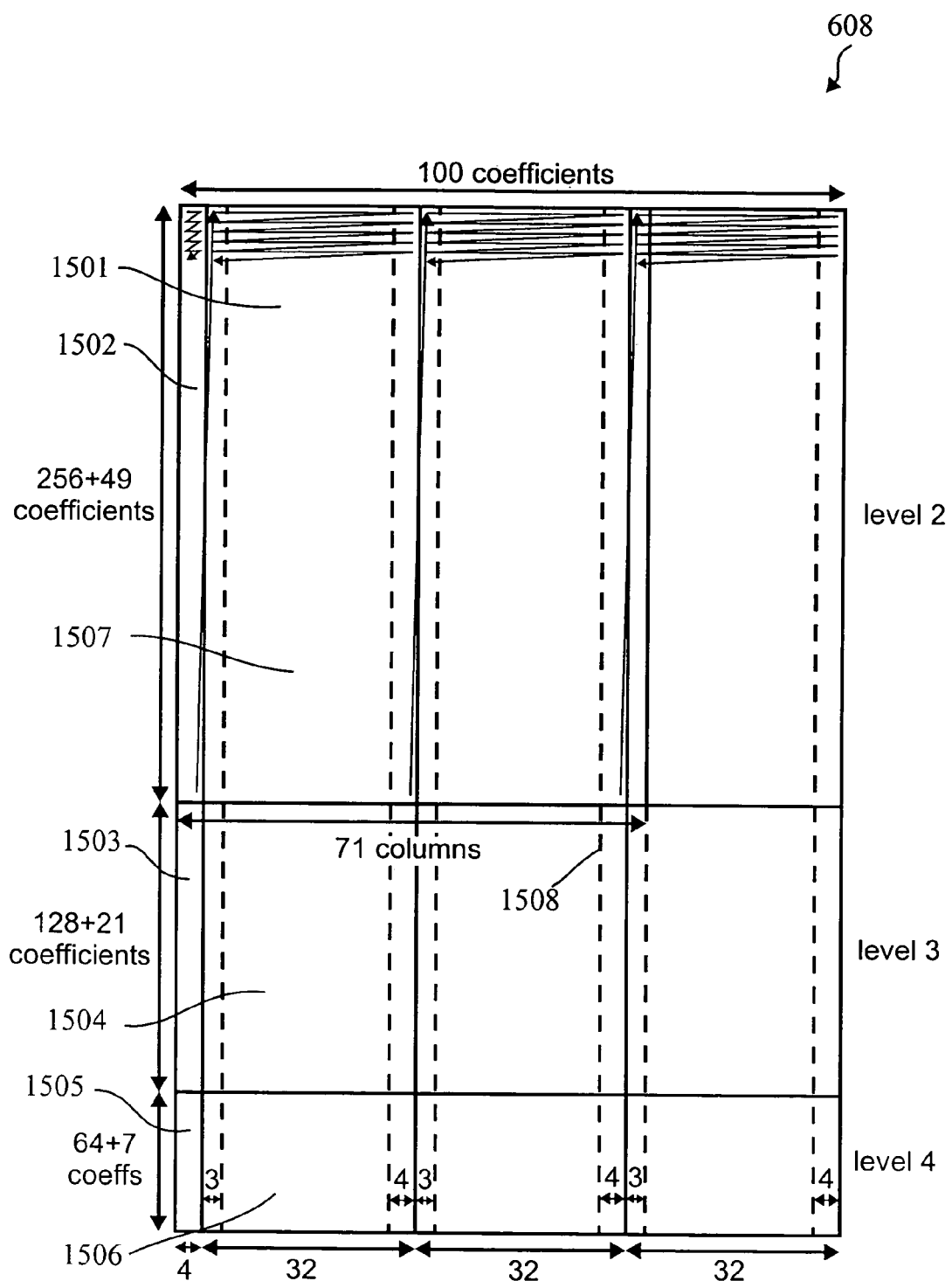
FIG. 15 represents a fill and scan order of the partial band buffer of FIG. 14.

Turning to FIG. 15 there is shown a representation of the data organisation of the partial band buffer 608. The Partial Band Buffer 608 is 100 coefficients wide and 525 coefficients high, plus an extra 6 of 100 coefficient wide rows (not shown in FIG. 15) as described above. The Partial band buffer 608 is written to with data (coefficients) after at least one level DWT decomposition of a tile is performed. Thus a tile of $(2^J H+7(2^J-1))\times(2W+7)$ of the image reduces to tile of coefficient after one level of decomposition. That is a 617×71 pixel tile after a first level of decomposition reduces to a tile of 305×32 coefficients. The Partial band buffer 608 of the preferred embodiment, at 100 coefficients wide, is thus designed to accommodate at least width-wise three 32-coefficient wide tiles 1501 and a 4-coefficient wide block 1502. Each 32-coefficient wide tile is written in scan line order left to right and top to bottom, one level at a time as shown in FIG. 15. That is, the three 32-coefficient wide tiles 1501 of coefficients for second level decomposition (each of length 256+49=305 coefficients) are fill each in zig-zag order. The 4-coefficient wide block 1502, at least for a first tile process, is filled with a mirror image of the first four columns of coefficients of a first 32-coefficient wide tile 1501 (hereinafter referred to as "padding" or "padded"). Padding is usually performed to account for boundaries of an image where pixel data outside the image boundary is non-existent. Other padding techniques are available to account for an image boundary. For example a simplest, but not necessarily the best, option is to pad the boundary of an image with zeros (0).

As the coefficients for the second level decomposition are processed through the Vertical filter 605 and Horizontal filter 606 modules, coefficients for a third level decomposition are accumulated in a next level 32-coefficient wide tile 1504 and (128+21)= 149 coefficients in length. Again, initially a 4-coefficient wide block 1503 is padded with coefficients of a corresponding (adjacent) tile 1504. As the coefficients of the third level decomposition are processed through the Vertical filter 605 and Horizontal filter 606 modules, coefficients for a four level decomposition are accumulated in a next level 32-coefficient wide tile 1506. Again, initially a 4-coefficient wide block 1505 is padded with coefficients of a corresponding (adjacent) tile 1506. In cases other than when at a boundary of an image were the 4-coefficient wide blocks 1502, 1503 and 1505 need to be padded the 4-coefficient wide blocks contain a last 4 columns of a previous tile, at that level, processed.

The 4-coefficient wide block at each level is used as overlap for filtering the horizontal lines. In order to generate one complete 32-coefficient wide tile at one level, requires 71 coefficients width at a previous level. The shaded area 1507 of FIG. 15 consisting of 305×71 coefficients for second level decomposition is required to generate a tile of 149×32 coefficients for third level decomposition. The coefficients in the shaded area 1507 are read out in scan line order, 71 to the line from left to right and top to bottom. Once the Partial Band buffer 608 is filled to a desired amount (eg 71 columns) at a next (higher) level, column addresses at a current level are incremented by sixty four (64) columns to the right, wrapping back to the first column as the addresses exceed the hundredth column. That is, for example processing of a next seventy one (71) columns of coefficients, at a current level, is commenced at the sixty fourth column 1508 of the buffer 608 and wrapping around to the first column of the buffer 608. Column sixty four (64) to column sixty eight (68), now provides a 4-coefficient wide block 1509 overlap necessary to process another seventy one (71) columns of data.

As each level of the Partial Band Buffer 608 is filtered, results of the filter (LL subband coefficients) are written to a next higher level of the Partial band buffer 608 shown in FIG. 15. When a highest level has been filtered (eg "level 4" of FIG. 15) a resulting LL subband coefficients are written to the Sub-Band Buffer 607 without further writing these coefficients into the Partial Band Buffer 608 and are encoded straight away, without further filtering.

When reading out of the Partial Band Buffer, 9×16=144 bits are read at a time. These 9 words represent 9 vertical coefficients from a single column of the buffer. Because the line address is incremented by two between reading complete lines out of this buffer, it is necessary to pass the 144-bit data stream through a barrel shifter to align the data with the data bus into the Vertical Filter. It is also necessary to read 2 words in succession to get one 144-bit word, building up the two parts of the word by holding the required bits of the first word in registers while the required bits from the second access are fetched. Only when the alignment of the line address is a multiple of 9 will one fetch only be required. In order to be able to fetch 144-bits at a time, the memory must physically be 144 bits wide. Extra decoding is required (so that just 16 bits can be written at a time) in the form of word write enables to the memory array.

Figure 16:
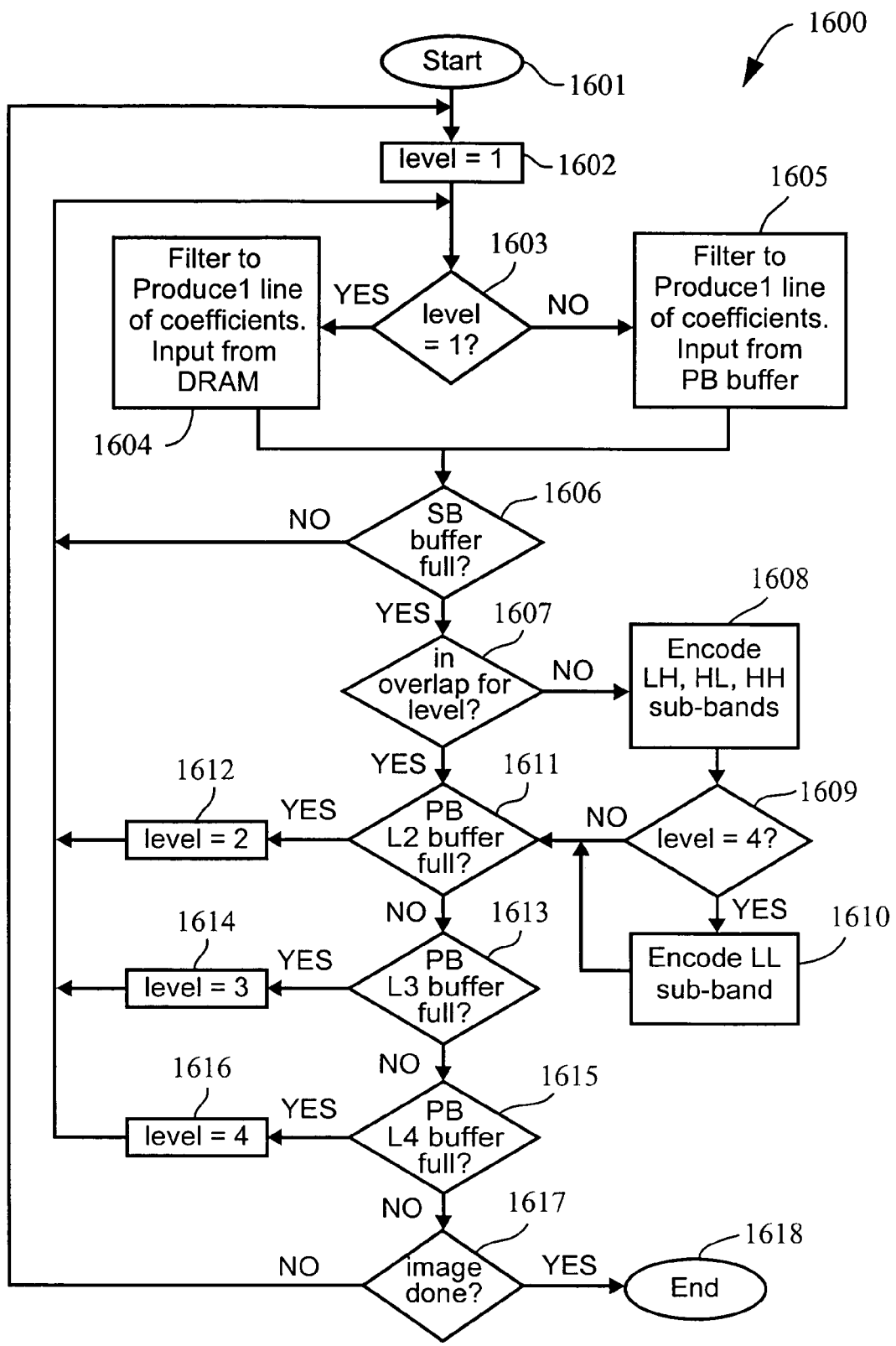
FIG. 16 is a block diagram representing a functionality of the control state machine of FIG. 13.

Referring to FIG. 16, there is illustrated a flow diagram 1600 for the Control State Machine module 604 of FIG. 6. The Control State Machine Module 604 is responsible for controlling the function of each module 601, 604–609 and for correctly routing data to each module in synchronism with a modules function (ie at the right time).

At commencement 1601 of image compression a "level" variable is set 1602 to one (1), which typically represents a first level of decomposition to be performed. A decision block 1603 is entered to determine if the current level of DWT decomposition is the first level. If decision block 1603 returns true (yes) then a first nine (9) lines of the image stored in DRAM 403 (FIG. 4) are filtered 1604 to produce a first line of sub-band data. Input data is retrieved from the external DRAM 403 for level 1. Otherwise the decision block 1603 returns false (no) causing the flow to proceed to block 1605 where data is retrieved from the internal Partial Band Buffer 608 and filtered (DWT decomposed to a next level). Enough data is retrieved from the Partial Band Buffer 608 to produce a line, of a tile, of DWT coefficients of a next level. These results are stored in the Partial Band Buffer 608 of a location for a corresponding level as previously described.

After 71 lines of data are filtered, 32 lines of subband buffer 607 storage are filled. At this point in the flow diagram 1600 a check 1606 is made to see if the subband buffer 607 is full. If this check 1606 returns false (no) the process flow is returned to decision block 1603 and continues as described above with reference to decision block 1603. If check block 1603 returns true (yes) a further decision (or check) block 1607 is entered and a check is made to see if the data is within an overlap region 200 for a level that is being filtered. If not, that is block 1607 returns false (no) then three subbands LH, HL and HH stored in the subband buffer 607 are encoded 1608. Following the encoding of the three subbands a decision block 1609 is entered and a check is made to determine if a current level of decomposition is a maximum level (that is level 4). If the current level is 4 decision block 1609 returns true (yes) a LL subband in the subband buffer 607 is also encoded 1610 and the flow process continues at decision block 1611. Further, at decision block 1609 if false (no) is returned the flow process continues at decision block 1611 without encoding the LL subband in the subband buffer 607.

Another entry to decision block 1611 is via decision block 1607, where decision block 1607 returns true (yes). That is, the data being processed is within an overlap region 201 or 200 of adjacent tiles. The check performed at decision block 1607 is used to prevent the encoding of the overlap region twice. The process flow proceeds to decision block 1611 when decision block 1607 returns true (yes).

At decision block 1611 a check is then made to see if at level 2 of the partial band buffer 608 (FIG. 6) has a complete set of 71 columns of (256+105) rows of coefficients. If so, then the level variable is set 1612 to two (2) and processing is resumed at decision block 1603 and continues through steps 1605 to 1611, as described above, with data retrieved from level two (2) of the partial band buffer 608.

If the level two (2) partial band buffer is not ready to be filtered, that is, a complete set (ie. a tile at level two (2) comprising 71 by 361 coefficients) is not present in the partial band buffer 608, then false is returned by decision block 1611 and check (decision) block 1613 is entered. At check block 1613 a check is made on whether at level three (3) of partial band buffer a complete set of 71 columns of (128+21) rows of coefficients are present. If so, then the level variable is set 1614 to three (3) and processing is resumed at decision block 1603 and continues through steps 1605 to 1613, as described above, with data retrieved from level three (3) of the partial band buffer 608.

If the level three (3) partial band buffer 608 is not ready to be filtered, that is, a complete set (ie. a tile at level three (3) comprising 71 by 149 coefficients) is not present in the partial band buffer 608, then false (no) is returned by decision block 1613 and check (decision) block 1615 is entered. At check block 1615 a check is made on whether at level four (4) of partial band buffer a complete set of 71 columns of (64+7) rows of coeffi-cients are present. If so, then the level variable is set 1616 to four (4) and processing is resumed at decision block 1603 and continues through steps 1605 to 1615, as described above, with data retrieved from level four (4) of the partial band buffer 608.

If the level four (4) partial band buffer 608 is not ready to be filtered, then false (no) is returned by decision block 1615 and check (decision) block 1617 is entered. At block 1617 a check is made to see if the entire image has been completely processed. If this is the case decision block 1617 returns true (yes) and the flow process terminates 1618. Otherwise, decision block 1617 returns false (no) and processing is resumed at block 1602, assigning the level variable one (1) and the processing is continued and described above with reference to steps 1602 to 1617 again with data retrieved from the external DRAM 403.

In the embodiment described, nine (9) source lines are required to generate the first line of coefficients, whereas two (2) source lines are needed to generate a next and each subsequent line of coefficients. A minimum of 71 lines of 71 pixels (or coefficients) are required to make 32 lines of 32 coefficients. The partial band buffer 608 is initially loaded with three tiles of coefficients in order to process a next level. For every subsequent tile to be generated at the next level only two additional tiles of input are necessary since the partial band buffer 608 already contains at least one tile from previously load data. In the present embodiment requires 71 columns of coefficients, in the partial band buffer, for a current level to allow filtering to a next level. That is, filtering starts with four (4) columns of coefficient from a previously processed tile and uses two additional (complete) tiles (32 columns each) and three (3) columns from a next tile to be processed to make up a 71 column tile. Optionally, the Partial Band Buffer 608 can be implemented as three separated memory units one for each level of decomposition rather than implementing the buffer 608 as a single buffer memory as illustrated in FIG. 15. This option may require separate read and write address generators.

Figure 17:
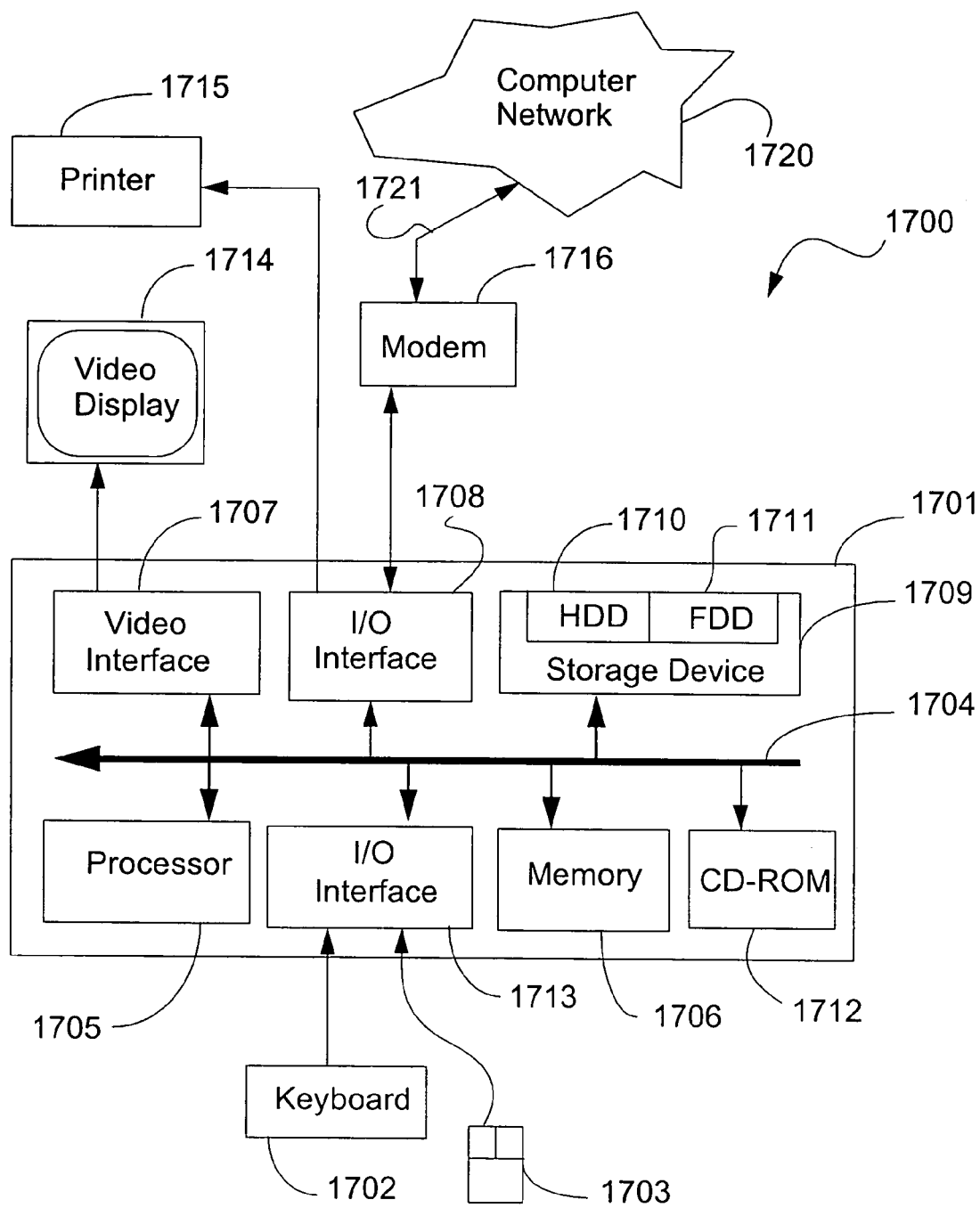
FIG. 17 is a schematic block diagram of a general purpose computer upon which the preferred embodiment of the present invention can be practiced.

The method of encoding a digital image can be practiced using a conventional general-purpose computer system 1700, such as that shown in FIG. 17 wherein the processes relating to FIGS. 2, 3 and 5, for example, can be implemented as software, such as an application program executing within the computer system 1700. In particular, the steps of the method of encoding a digital image are effected by instructions in the software that are carried out by the computer. The software can be divided into two separate parts; one part for carrying out the encoding methods, and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an apparatus for encoding a digital image in accordance with the embodiments of the invention.

The computer system 1700 comprises a computer module 1701, input devices such as a keyboard 1702 and mouse 1703, output devices including a printer 1715 and a display device 1714. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN).

The computer module 1701 typically includes at least one processor unit 1705, a memory unit 1706, for example formed from semiconductor random access memory (RAM) and read only memory (ROM), input/output (I/O) interfaces including a video interface 1707, and an I/O interface 1713 for the keyboard 1702 and mouse 1703 and optionally a joystick (not illustrated), and an interface 1708 for the modem 1716. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. The components 1705 to 1713 of the computer module 1701, typically communicate via an interconnected bus 1704 and in a manner which results in a conventional mode of operation of the computer system 1700 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 1710 and read and controlled in its execution by the processor 1705. Intermediate storage of the program and any data fetched from the network 1720 may be accomplished using the semiconductor memory 1706, possibly in concert with the hard disk drive 1710. In some instances, the application program can be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable medium including magnetic tape, a ROM or integrated circuit, a magneto-optical disk, a radio or infra-red transmission channel between the computer module 1701 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of encoding a digital image can alternatively preferably be implemented in dedicated hardware such as one or more integrated circuits performing the functions or sub functions of encoding a digital image. Such dedicated hardware may include graphic processors, digital signal processors, or one or more microprocessors and associated memories.

Entropy Encoder

An encoder for generating a coded representation of a digital image is now described.

A method is described for producing a coded representation of coefficients of a transform of an image. In particular, the method relates to embedded block coding using quadtrees.

The method proceeds initially by means of a wavelet transform of image data. An overview of the wavelet process will now be described with reference to the accompanying drawings.

Referring initially to FIG. 18, an original image 1801 is transformed utilizing a Discrete Wavelet Transform (DWT) into four sub-images 1803–1806. The sub-images or subbands are normally denoted LL1, HL1, LH1 and HH1. The one suffix on the subband names indicates level 1. The LL1 subband is a low pass decimated version of the original image.

The wavelet transform utilized can vary and can include, for example, Haar basis functions, Daubechies basis functions etc. The LL1 subband is then in turn utilized and a second Discrete Wavelet Transform is applied as shown in FIG. 19 giving subbands LL2 (1908), HL2 (1909), LH2 (1910), HH2 (1911). This process is continued for example as illustrated in FIG. 20 wherein the LL4 subband is illustrated. Obviously, further levels of decomposition can be provided depending on the size of the input image. The lowest frequency subband is referred to as the DC subband. In the case of FIG. 20, the DC subband is the LL4 subband.

Each single level DWT can, in turn, be inverted to obtain the original image. Thus, a J-level DWT can be inverted as a series of J-single level inverse DWT's.

To code an image hierarchically the DC subband is coded first. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in an image. After quantisation of the subbands, they often consist of a sparse array of values and substantial compression can be achieved by efficient encoding of their sparse matrix form.

Figure 21:
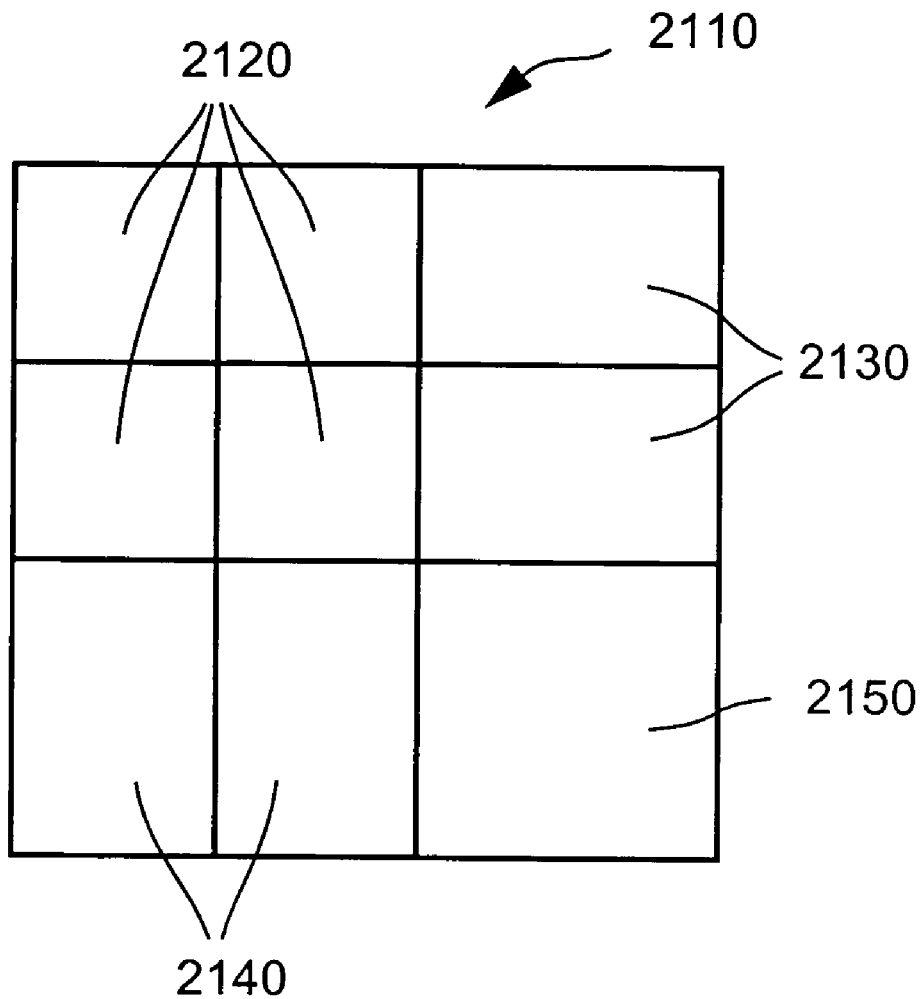
FIG. 21 illustrates the tiling of the subbands into 32×32 blocks.

Turning now to FIG. 21, there is shown the tiling of the subbands, such as HH1. The subbands are preferably tiles 2110, 2120, 2130, 2140 and 2150 with 32×32 blocks of coefficients beginning from the top left-hand corner. The nomenclature 32×32 refers to 32 rows by 32 columns respectively.

Before proceeding with a description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. In addition, a transform of an image may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space that passes through each bit sequence at the same bitnumber is referred to as a "bitplane" or "bit plane". The term "bit plane number n" refers to that bit plane that passes through bit number n.

To simplify the description, the transform coefficients are assumed hereinafter to be represented in a fixed point unsigned binary integer format, with an additional single sign bit. Preferably, 16 bits is used. That is, the decimal numbers −9 and 9 are represented with the same bit sequence, namely 1001, with the former having a sign bit equal to 1 to indicate a negative value, and the latter having a sign bit equal to 0 to indicate a positive value. In using an integer representation, the coefficients are implicitly already quantized to the nearest integer value, although this is not necessary. Further, for the purpose of compression, any information contained in fractional bits is normally ignored.

A region of an image frame includes a set of contiguous image coefficients. The term coefficient is used hereinafter interchangeably with pixel, however, as will be well understood by a person skilled in the art, the former is typically used to refer to pixels in a transform domain (eg., a DWT domain). These sets or regions T are defined as having transform image coefficients $\{c_{i,j}\}$, where (ij) is a coefficient coordinate. fixed point unsigned binary integer format, with an additional single sign bit. We typically use 16 bits.

A set or the region T of pixels at a current bit plane is said to be insignificant if the msb number of each coefficient in the region is less than the value of the current bit plane. To make the concept of region significance precise, a mathematical definition is given in Equation (1). A set or region T of pixels is said to be insignificant with respect to (or at) bit plane n if, $$|c_{i,j}| < 2^n, \text{ for all } c_{i,j} \in T \qquad (1)$$

By a partition of a set T of coordinates we mean a collection $\{T_m\}$ of subsets of T such that $$T = \bigcup_{m=1}^{n} T_m, \quad T_n \cap T_m = 0 \quad \forall \, n \neq m$$

In other words if $c_{i,j} \in T$ then $c_{i,j} \in T_m$ for one, and only one, of the subsets $T_m$. In our case T is a square region and the set $\{T_m\}$ is the set consisting of the four quadrants of T.

The proposed method encodes a set of coefficients in an embedded manner using quadtrees. The use of the term embedded is taken to mean that every bit in a higher bit plane is coded before any bit in a lower bit plane. For example, every bit is coded in bit plane 7 before any bit in bit plane 6. In turn, all bits in bit plane 6 are coded before any bit plane 5 and so on.

A preferred embodiment of the proposed method is implemented utilizing the following pseudo-code. The proposed method preferably encodes a square block of coefficients, with a block size that is a power of 2 (typically 32×32 coefficients). Further, the proposed method utilizes a quadtree partition: that is each set or region is partitioned into its 4 quadrants: thus maintaining at all times square regions with a dimension equal to a power of two. The proposed method, during commencement, initializes three lists: a list of insignificant regions (LIR); a list of insignificant coefficients (LIC); and a list of significant coefficients (LSC). When single coefficients are removed from the list of insignificant sets (LIR), they are added to either the list of insignificant coefficients (LIC) or to the list of significant coefficients (LSC), depending on the significance of the coefficient.

The proposed method is initialized as follows. The LIC and LSC are initialized to be empty. The LIR is set to contain the four quadrants of the input block. The method commences by finding and coding $n_{max}$, which is the largest bit plane that contains a 1 bit for all the coefficients in the set. The proposed method then proceeds as follows:

1. Set $n=n_{max}$

2. For each coefficient in the list of insignificant coefficients (LIC)
   Code bit n of the coefficient (i.e. its significance)
   If the bit is 1 (i.e. it is significant) code a sign bit. Add the coefficient to the end of the LSC and remove the coefficient from the LIC.

3. For each region T in the list of insignificant regions (LIR)
   Code the significance of T.
   If T is significant and consists of more than one coefficient then partition T into its four quadrants and add these to the end of the LIR. Remove T from the list.
   If T is a single coefficient
   Remove T from the LIR
   If T is significant code a sign bit and add T to the end of the LSC
   Else add T to the end of the list of LIC 4. For each coefficient $c_{i,j}$ in the list of significant coefficients LSC (excluding those added to the list in step 3)
   Code bit n of $c_{i,j}$.

5. decrement n and go to step 2.
   From the above, it can seen that output bitstream generally takes the following form

. . . LIC'LIR'LSC' . . . .

where LIR' is the coded representation undertaken in step 3; LIC' is the coded representation undertaken in step 2; and LSC' is the coded representation undertaken in step 4. However, it should be noted that during the first iteration of the encoding process both LIC and LSC are empty and thus the output bitstream for the first iteration takes the form LIR'.

In addition to the proposed method, a simple Huffman code (or better a Golomb code) may be used to code groups of bits (for example groups of 4 bits) when coding the LIC and LSC. Further, when coding the significance of each quadrant of a region a 15-level Huffman code may be used to indicate the significance pattern of each of the 4 quadrants (one quadrant must be significant, hence the significance pattern can be one of 15 (and not 16) different patterns. Other forms of entropy encoding can be used, such as binary arithmetic coding to exploit any remaining redundancy.

As an alternative embodiment, the proposed method at step 3, if T consists of a 2×2 block of coefficients, may perform the following substep. Immediately code and output the significance of each coefficient of the 2×2 block, output the corresponding sign bit(s) if they are significant; and then add the coefficients to the end of the LSC or the LIC as appropriate. In the latter substep, the significant coefficients are added to the LSC list whereas the insignificant coefficients are added to the LIC list.

Preferably, the proposed method encodes a 32×32 block of data coefficients. For illustrative purposes only, the following example of a 4×4 block of coefficients is encoded in accordance with the proposed method.

$$\begin{bmatrix} 31 & 16 & 0 & 0 \\ 15 & 17 & 0 & 0 \\ 9 & 7 & 1 & 0 \\ 5 & 3 & 1 & 0 \end{bmatrix}$$

The above block consists of four quadrants A,B,C and D. The symbol A designates the top-left (2×2) quadrant of the block, B the top right, C the bottom left, and D the bottom right quadrant respectively. Furthermore, the symbols A1 denote the top left pixel of A, A2 the top right, A3 the bottom left, A4 the bottom right pixels respectively. Similarly B1 denotes the top left pixel of B and so on for the rest of the pixels.

According to the proposed method, $n_{max}$ is first determined, which in this case is 4. That is, the most significant bit of each coefficient is in bit plane 4 or less. Note, the numbering of the bit planes commences from 0. The variable $n_{max}$ is coded with 4 bit (since the coefficients have been constrained, so that $n_{max}$ is between 0 and 15.). Initially LIC=φ, LIR={A, B, C, D} and LSC=φ where symbol φ is used to denote the empty list.

Then, according to the proposed method, the bit planes are iteratively coded. The process commences at bit plane $n=n_{max}=4$, and decrements n by one at each iteration.

1. At $n=n_{max}=4$
   First, each coefficient in the list LIC is coded. Since there are none, no coding is undertaken.
   Then, the significance of each region in the list LIR is coded.
   For region A, a 1 bit is outputted, since it is significant at bit plane n= 4. Then, the four quadrants of A are added, namely A1, A2, A3 and A4, to the end of the list LIR, and A is removed. Hence now LIR={B, C, D, A1, A2, A3, A4}.
   For region B, a 0 bit is output, since it is insignificant at bit plane n=4.
   For region C, a 0 bit is output.
   For region D, a 0 bit is output.
   For region A1, a 1 bit is output. Since A1 consists of the single coefficient 31, A1 is removed from the LIR. Since 31 (or A1) is significant, it is added (or its location in the block) to the LSC. The sign bit (0) of A1 is also outputted.

For region A2, a 1 bit is output. Since A2 consists of the single significant coefficient 16, it is removed from the LIR, and added to the end of the LSC. The sign bit (0) of A2 is also outputted. Now we have LSC={31, 16}.

For region A3, a 0 bit is output. Since it is a single insignificant coefficient we remove it from the LIR, add the coefficient 15 to the LIC. Now LIC={15}.

For region A4 a 1 bit is output. Since A4 consists of the single significant coefficient 17, it is removed from the LIR, and added to the end of the LSC. The sign bit (0) of A4 is also outputted. Now LSC= {31, 16, 17}.

Each coefficient in the LSC that was not added in the last step is now coded. Since there are none, no coding is undertaken.

Thus at the first iteration, the proposed method outputs the following bitstream 1000 10 10 0 10

At this stage, all the bits in bit plane 4 (and higher) have been coded. That is a decoder can reconstruct bit plane 4 (and higher) by reading in the bits from the coded bit stream. The decoding method is the same except that the significance decisions are determined by reading from the bit stream (this is why the significance decision is written to the bit stream). The other coefficient bits are simply read in as is. Note that the decoder execution path is identical to the encoder, so that the decoder knows the meaning of each new bit that it reads.

2. At n=3

Initially LIC={15}, LIR={B, C, D} and LSC={31, 16, 17}.

Firstly, bit n=3 of each coefficient in the LIC is coded. That is, a 1 bit is output for the coefficient 15 and a sign bit (0). Since it is significant (a 1 bit has been outputted), a sign bit is outputted, the coefficient 15 is removed from LIC and added to the end of the LSC. So now LSC={31, 16, 17, 15}.

The significance of each of the regions in LIR are now coded

For region B, a 0 bit is output.

For region C, a 1 bit is output, since it is significant at bitplane n=3. The region C is partitioned into four quadrants C00,C01,C10 and C11 which are added to the end of LIR. C is then removed from LIR. Hence now LIR={B,D, C00,C01,C10, C11}.

For region D, a 0 bit is output.

For region C00, a 1 bit is output. Since C00 consists of the single significant coefficient 9, it is removed from the LIR, and added to the end of the LSC. The sign bit (0) of C00 is also outputted. Now we have LSC={31, 16,17,15,9}.

For region C01, a 0 bit is output. Since it is a single insignificant coefficient we remove it from the LIR, add the coefficient 7 to the LIC. Now LIC={7}.

For region C10, a 0 bit is output. Since it is a single insignificant coefficient we remove it from the LIR, add the coefficient 5 to the LIC. Now LIC={7,5}.

For region C11, a 0 bit is output. Since it is a single insignificant coefficient we remove it from the LIR, add the coefficient 3 to the LIC. Now LIC={7,5,3}

Now we code bit n=3 of each coefficient on the LSC (that was not just added above)

We output 1, 0, and 0 as bit n=3 of 31, 16 and 17 respectively Thus at the second iteration, the proposed method outputs the following bitstream 10 0 1 0 10 0 0 0 1 0 0

3. At n=2

Initially we have LIC={7, 5, 3}, LIR={C, D} and LSC={31, 16, 17, 15, 9}.

Firstly, bit n=2 (or equivalently the significance at bit plane n=2) of each coefficient in the LIC is coded. That is, we output a 1, 1, and 0 for 7, 5, and 3 respectively. In addition, a sign bit for 7 (0) and 5 (0) is outputted and these coefficients are moved to the LSC. We leave 3 in the LIC.

Then the significance of each region in the LIR is coded

For region B, a 0 bit is output and for region D a 0 bit is output.

Finally we update bit n=2 for each of the coefficients in the LSC (not added above).

We output a 1, 0, 0, 1, and 0 for 31, 16, 17, 15 and 9 respectively.

Thus at the third iteration, the proposed method outputs the following bitstream 10 10 0 0 0 1 0 0 1 0

We continue in this fashion until bit plane 0, or some other terminating point. Note that we can terminate after any one of the (three) sub-passes, if we use a special termination code. (Basically FF is reserved as a termination code, and we force the coded bit stream never to contain an FF, unless we deliberately insert a termination code.

As mentioned previously, the method is preferably utilized in encoding 32×32 blocks of coefficients. In these circumstances, the original quadrants A,B,C,D each consist of 16×16 coefficients and the regions A1,A2, . . . D4 each consist of 8×8 coefficients.

It will be thus evident in encoding a 32×32 block, the block is partitioned in accordance with quadtree method five times, whereas in the example given the 4×4 block is partitioned only twice.

The decoding process simply mimics the encoding process to reconstruct the pixels from the coded representation.

Figure 22:
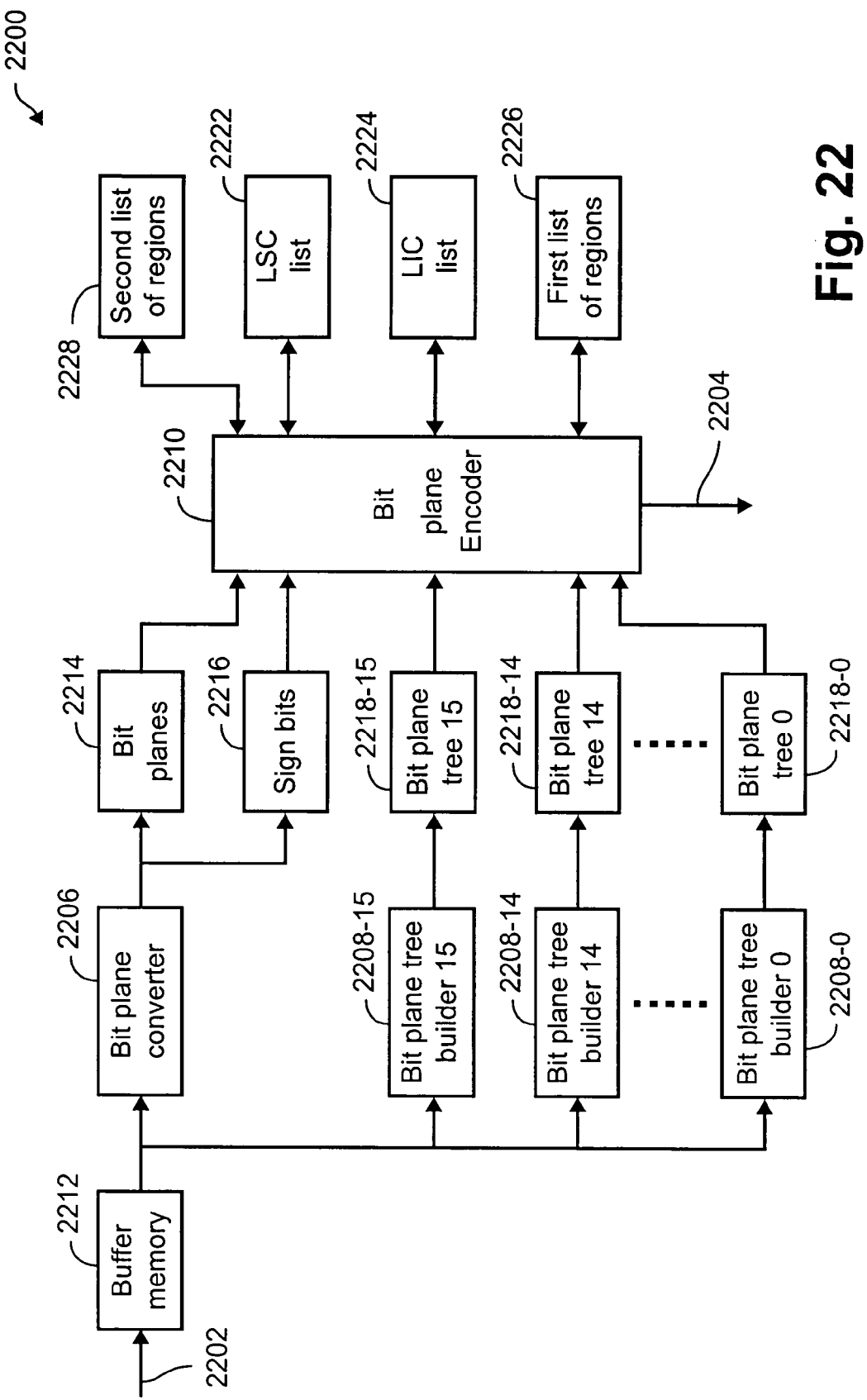
FIG. 22 illustrates an encoder embodiment.

Turning to FIG. 22, there is shown an encoder in accordance with a first preferred embodiment for implementing the proposed method. The coefficient encoder 2200 is designed to provide a continual flow of output encoded data 2204 taking in corresponding data 2202. The encoder 2200 includes the following logic portions; a bit plane converter 2206; bit plane tree builders 2208-0 to 2208-15; and a bit plane encoder 2210.

The encoder 2200 also includes a memory 2214 for storing the 32×32 coefficients in bit planes; a memory 2216 for storing the sign bits of the coefficients; and memories 2218-15 to 2218-0 for storing bit plane trees 0 to 15. The encoder 2200 further includes a memory 2226 for storing a first list of regions; a FIFO memory 2228 for storing a second list of regions; a memory 2222 for storing a list of LSC values; and a memory 2224 for storing a list of LIC values.

The encoder 2200 operates in the following manner. Initially, the 32×32 input coefficient data are stored in the memory 2212 in raster order. The bit plane converter 2206 reads the input coefficient data and converts the data into 16 bit planes from bitplane 0 through to bitplane 15, which are subsequently stored in memory 2214. The bit plane converter 2206 also determines the sign bit of the coefficients of the 32×32 block, which sign bits are stored in memory 2216.

The bit plane tree builders 2208-0 to 2208-15 each read the 32×32 coefficient data and construct a quadtree structure having nodes corresponding to regions and 1×1 pixels. In each tree, the nodes are set to 1 if the region or pixel corresponding to that node is significant for that bitplane. If the significant bit for the region or pixel corresponding to that node is greater than or less than the bitplane then the node is set to zero.

Figure 23:
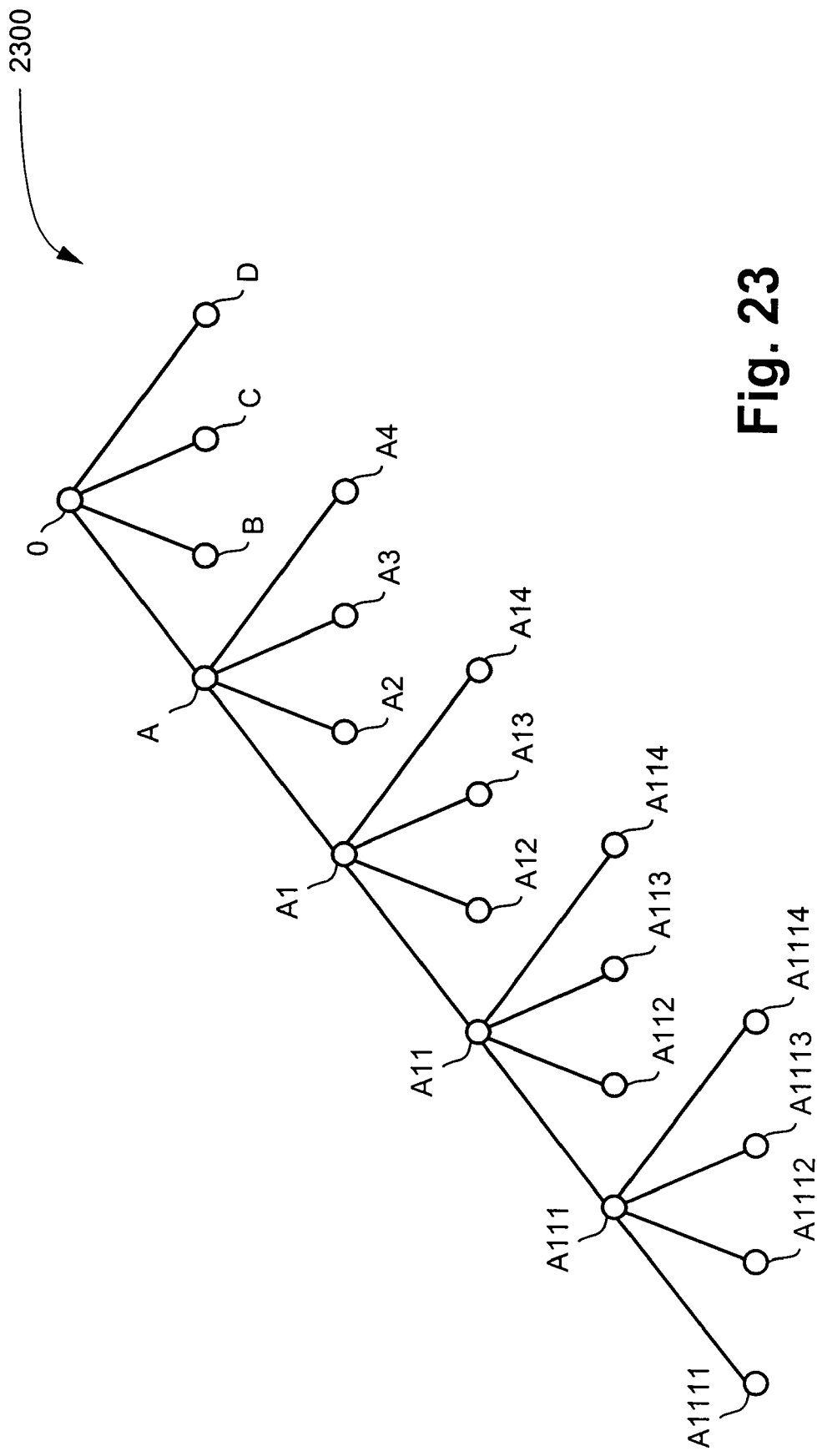
FIG. 23 illustrates a portion of a tree constructed by a bitplane tree builder of FIG. 22.

Turning now to FIG. 23, there is shown a constructed tree 2300 built by a bitplane treebuilder 2208-n at a bitplane n for a 32×32 block. For simplicities sake only a portion of the tree is shown. The tree 2300 includes nodes representing each quadtree partition of the block down to the 1×1-pixel level. In this tree, the whole 32×32 block is represented by the symbol O. The 16×16 top left quadrant is represented by node A, the 16×16 top right quadrant is represented by B, the 16×16 bottom left quadrant is represented by node C, the 16×16 bottom right quadrant is represented by node D. The nodes A1,A2,A3,and A4 represent the top left, top right, bottom left, and bottom right 8×8 quadtree partitions of the quadrant A respectively. Similarly, the nodes A11, A12,A13, and A14 represent the top left, top right, bottom left, and bottom right 4×4 quadtree partitions of the quadrant A1 respectively. Similarly the nodes A111, A112,A113,and A114 represent the top left, top right, bottom left, and bottom right 2×2 quadtree partitions of the quadrant A11 respectively. Finally, the nodes A111, A1112, A1113, and A1114 represent the top left, top right, bottom left, and bottom right 1×1 quadtree partitions (i.e. pixels) of the quadrant A 111 respectively. The remaining parts of the tree (not shown) is represented in a similar manner down to each 1×1 quadrant of the 32×32 block.

The bit plane treebuilder 2208-n builds such a tree from bottom up for bitplane n by reading the coefficients in quadrant order (e.g. A1111,A1112,A1113, and A1114). The tree builder sets the nodes of the tree to 1 if the region or pixel corresponding to that node is significant for that bitplane. If the significant bit for the region or pixel corresponding to that node is greater than or less than the bitplane then the node is set to zero by the tree builder. The bit plane tree builder then outputs the significance information for each node in the following format A B C D A1 A2 A3 A4 A11 A12 A13 A14 A21, . . . ,
D44 A111, . . . ,D444 A1111, . . . , D4444

The output from each of the bitplane tree builders 2208-0 to 2208-15 are then stored in respective bitplane tree memories 2218-0 to 2218-15.

The bit plane encoder 2210 reads each of the bit plane tree memories in turn, commencing with bit plane tree memory 2218-15. The bit plane encoder 2210 starts processing by reading in turn the four significance bits A,B,C, and D stored in the bit plane memory 2218-15 corresponding to the nodes A, B, C, and D. The bit plane encoder stores a list of these nodes {A,B,C,D} in a first list of regions in memory 2226. The bit plane encoder 2210 then proceeds with the following operations:

1. The bit plane encoder 2210 reads the bit in the bit plane tree corresponding to the first node (region) on the first region list.
   a. If the bit is significant, the encoder outputs a binary one. The encoder then stores the children of the node in the second region list on the FIFO 2228 and removes the node from the first region list 2226.
   b. If the bit is insignificant, the encoder outputs a binary zero and retains the node on the first region list 2226.
2. The bit plane encoder 2210 repeats step 1 until all nodes in the first region list have been read.
3 The bit plane encoder reads the bit in the bit plane tree corresponding to the first node in the second region list on the FIFO 2228.
   a. If the bit is insignificant and there are children to that node (viz. there are nodes directly below that node in the tree), the encoder outputs a binary zero and puts that node on first region list 2226.
   b. If the bit is insignificant and there are no children to that node, the encoder outputs a binary zero and that node is stored on the LIC list 2224 as an index to the corresponding pixel.
   c. If the bit is significant and has no children to that node, the encoder outputs a binary one and the corresponding sign bit and stores that node on the LSC list 2222 as an index to the corresponding pixel.
   d. If the bit is significant and has children to that node, the encoder outputs a binary one and removes the node from the second region list. In addition, it adds the children of that node to the second region list.
   e. If the second region list is empty, the encoding process is completed for that bit plane tree.

The bit plane encoder repeats this operation for the remaining bit plane trees in turn. The first list of regions at the start of the operation on the current bitplane tree contains those regions remaining from the previous operation on the previous bitplane tree. These outputs bits correspond to the LIR' portion of the output stream. After completion of a current operation for a current bitplane tree, the bitplane encoder then encodes and outputs the LIC and LSC bits.

The bit plane encoder encodes the LIC bits by reading the LIC list for the index to the first pixel on the list, and using the current bit plane number selects the bit needed from the bit plane memory 2214. If the selected bit is a binary zero, then the encoder outputs a zero. If the selected bit is a binary one, then the encoder outputs a binary one together with the sign bit of the pixel from memory 2216. The encoder then removes the index from the LIC list and adds it to the LSC list. Preferably, once an index is removed from the list, the remaining indices are reorganized. The encoding is completed once the LIC list is traversed.

The bit plane encoder encodes the LSC bits by reading the LSC list for the index to the first pixel on the list, and using the current bit plane number to select the bit needed from the bit plane memory 2214. The selected bit is then outputted. The bit plane encoder also includes a counter for storing a length value, which is indicative of the number of pixels in the LSC list to be read. At the end of the LSC encoding the value is updated so that the new elements from LIR and LIC can be added.

Figure 24:
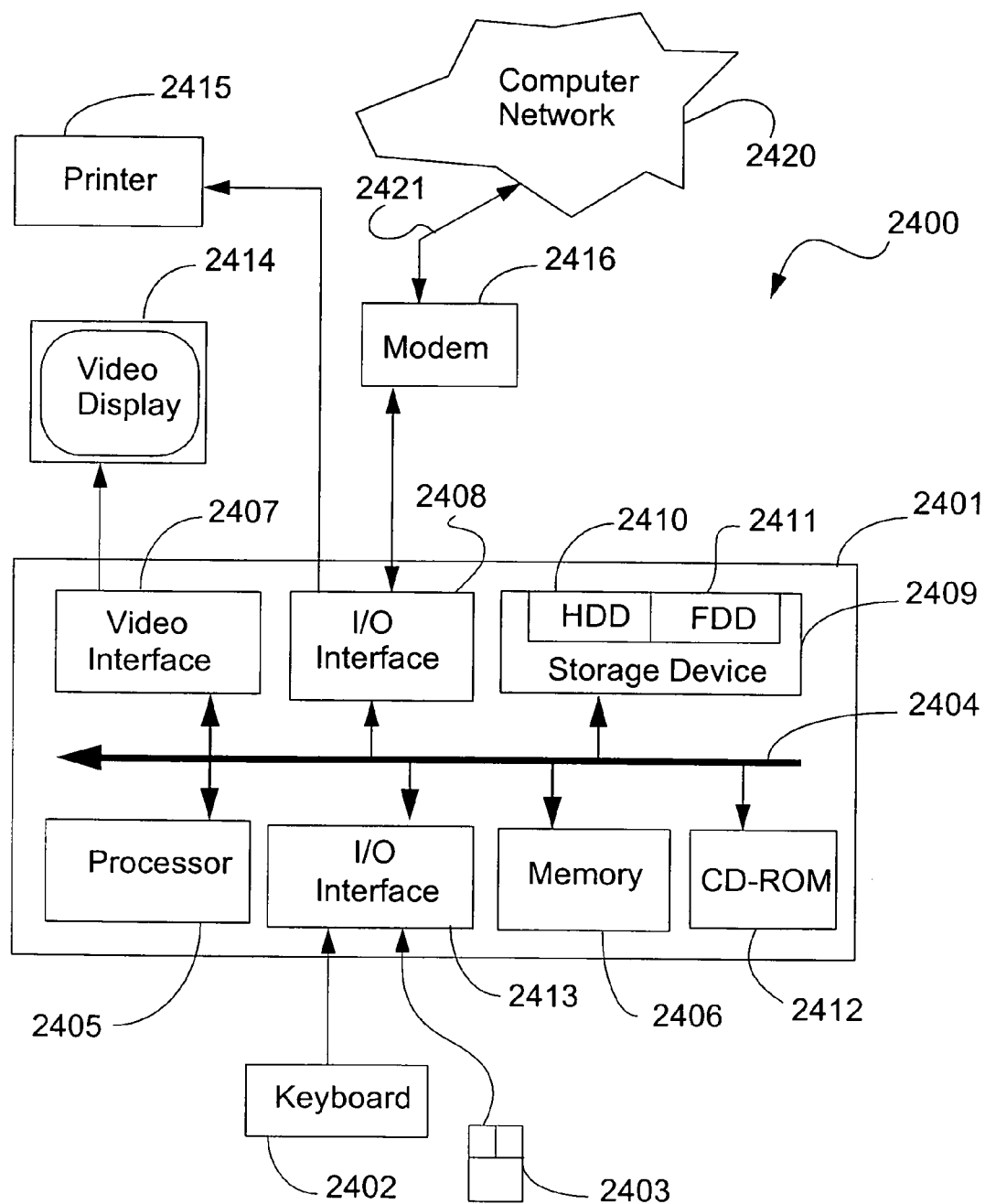
FIG. 24 illustrates a general-purpose computer for implementing the described encoding method.

The encoding and decoding processes of the proposed method are preferably practiced using a conventional general-purpose computer, such as the one shown in FIG. 24, wherein the processes may be implemented as software executing on the computer. In particular, the steps of the coding and/or decoding methods are effected by instructions in the software that are carried out by the computer. The software may be divided into two separate parts; one part for carrying out the encoding and/or decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images and decoding coded representations of digital images in accordance with the embodiments of the invention.

The computer system 2400 consists of the computer 2401, a video display 2414, and input devices 2402, 2403. In addition, the computer system 2400 can have any of a number of other output devices including line printers, laser printers, plotters, and other reproduction devices connected to the computer 2401. The computer system 2400 can be connected to one or more other computers via a communication interface 2408 using an appropriate communication channel 2421 such as a modem communications path, a computer network, or the like. The computer network may include a local area network (LAN), a wide area network (WAN), an Intranet, and/or the Internet.

The computer 2401 itself consists of a central processing unit(s) (simply referred to as a processor hereinafter) 2405, a memory 2406 which may include random access memory (RAM) and read-only memory (ROM), input/output (IO) interfaces 2408, 2413, a video interface 2407, and one or more storage devices generally represented by a block 2409 in FIG. 24. The storage device(s) 2409 can consist of one or more of the following: a floppy disc, a hard disc drive, a magneto-optical disc drive, CD-ROM, magnetic tape or any other of a number of non-volatile storage devices well known to those skilled in the art. Each of the components 2405 to 2413 is typically connected to one or more of the other devices via a bus 2404 that in turn can consist of data, address, and control buses.

The video interface 2407 is connected to the video display 2414 and provides video signals from the computer 2401 for display on the video display 2414. User input to operate the computer 2401 can be provided by one or more input devices 2402-3. For example, an operator can use the keyboard 2402 and/or a pointing device such as the mouse 2403 to provide input to the computer 2401.

The system 2400 is simply provided for illustrative purposes and other configurations can be employed. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments may be practiced. Typically, the processes of the embodiments, described hereinafter, are resident as software or a program recorded on a hard disk drive (generally depicted as block 2410 in FIG. 24) as the computer readable medium, and read and controlled using the processor 2405. Intermediate storage of the program and pixel data and any data fetched from the network may be accomplished using the semiconductor memory 2406, possibly in concert with the hard disk drive 2410.

In some instances, the program may be supplied to the user encoded on a CD-ROM or a floppy disk (both generally depicted by block 2411), or alternatively could be read by the user from the network via a modem device connected to the computer, for example. Still further, the software can also be loaded into the computer system 2400 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like.

The foregoing are merely exemplary of relevant computer readable mediums. Other computer readable mediums may be practiced.

Turning from the entropy encoder, and briefly back to the encoding method and apparatus, the following is noted. In the reverse direction, ie in performing reconstruction of the encoded image by decoding. The encoded image can first be fully entropy-decoded, and then a process applied to the now decoded image, said process being substantially the reverse of the encoding method described.

INDUSTRIAL APPLICABILITY

It is apparent from the above that the embodiments of the invention are applicable to the computer and image/data processing industries.

The foregoing describes only some embodiments of the present invention, and modifications and/or changes can be made thereto without departing from the scope and spirit of the invention, the embodiments being illustrative and not restrictive.

What is claimed is:

1. A method of encoding a digital image comprising a plurality of pixels, the image being able to be transformed by a discrete wavelet transform (DWT) to a predetermined level of decomposition, and capable of being encoded on a block by block basis, each block having a specified block size in number of coefficients, in a first dimension and a second dimension, the method comprising the steps of:
   a) dividing the image into a plurality of tiles, each tile having firstly, substantially a minimum number of pixels required to produce the number of coefficients in the first dimension of the block at the predetermined level of DWT decomposition, wherein the predetermined level of DWT decomposition is greater than one, and secondly, less than a minimum number of pixels required to produce the number of coefficients in the second dimension of the block at the predetermined level of DWT decomposition;
   b) selecting a current tile;
   c) decomposing the current tile, using the DWT, to one level of decomposition to form a plurality of subbands including a LL, LH, HL and HH subband;
   d) accumulating coefficients in each subband of the LH, HL and HH subbands to form blocks of the specified block size, and encoding each block to a bit stream;
   e) accumulating LL subband coefficients and repeating steps b) to e) until a predetermined number of coefficients, dependent on the specified block size, of the LL subband have been accumulated;
   f) assigning as a current tile the predetermined number of accumulated LL sub-band coefficients;
   g) repeating steps c) to f) until the predetermined level of DWT decomposition is reached; and
   h) encoding the LL subband into the bit stream.

2. A method according to claim 1, wherein accumulating coefficients in each subband includes accumulating coefficients in corresponding subbands of different tiles.

3. A method according to claim 1, wherein encoding comprises encoding each block substantially as each block is accumulated.

4. A method according to claim 1, wherein the specified block size comprises H coefficients in the first dimension by W coefficients in the second dimension.

5. A method according to claim 4, wherein the number of coefficients in the first dimension is equal to the number of coefficients in the second dimension (W=H).

6. A method according to claim 4, wherein the predetermined level of DWT decomposition is J and the minimum number of pixels in a first dimension of each tile is defined by $2^J H+O(2^J-1)$, where O is an overlap required by the DWT filter.

7. A method according to claim 6, wherein the number of pixels in a second dimension of each tile is less than that of the first dimension and is defined by 2W+O.

8. A method according to claim 6, wherein the DWT filter is a Daubechies 9/7 filter and the overlap required is 7 pixels or coefficients coefficient (O=7).

9. A method according to claim 6, wherein the DWT filter is a Haar filter and the overlap required is no pixels or coefficient (O=0).

10. A method of decoding a digital image comprising a plurality of pixels, the image having been transformed by a discrete wavelet transform (DWT) to a predetermined level of decomposition, and having been encoded on a block by block basis, each block having a specified block size in number of coefficients, in a first dimension and a second dimension, the image having been divided into a plurality of tiles, each tile having firstly, substantially a minimum number of pixels required to produce the number of coefficients in the first dimension of the block at the predetermined level of DWT decomposition, and secondly, less than a minimum number of pixels required to produce the number of coefficients in the second dimension of the block at the predetermined level of DWT decomposition, the decoding method comprising substantially the inverse steps to those recited in claim 1.

11. An apparatus adapted for decoding a digital image comprising a plurality of pixels, the image having been transformed by a discrete wavelet transform (DWT) to a predetermined level of decomposition, and having been encoded on a block by block basis, each block having a specified block size in number of coefficients, in a first dimension and a second dimension, the image having been divided into a plurality of tiles, each tile having firstly, substantially a minimum number of pixels required to produce the number of coefficients in the first dimension of the block at the predetermined level of DWT decomposition, and secondly, less than a minimum number of pixels required to produce the number of coefficients in the second dimension of the block at the predetermined level of DWT decomposition, said apparatus adapted to implement the method recited in claim 10.

12. A method of encoding a digital image comprising a plurality of pixels, the image being able to be transformed by a discrete wavelet transform (DWT) to a predetermined level of decomposition and capable of being encoded on a block by block basis, each block having a specified block size in number of coefficients, in a first dimension and a second dimension, the method comprising the steps of:
  a) dividing the image into a plurality of tiles, each tile having firstly, substantially a minimum number of pixels required to produce the number of coefficients in the first dimension of the block at the predetermined level of DWT decomposition, wherein the predetermined level of DWT decomposition is greater than one, and secondly, less than a minimum number of pixels required to produce the number of coefficients in the second dimension of the block at the predetermined level of DWT decomposition;
  b) selecting a tile of the image as a current tile;
  c) decomposing the current tile, using the DWT, to provide a plurality of coefficients in LL, LH, HL and HH subbands;
  d) encoding coefficients of the LH, HL, HH subbands of a current level of DWT decomposition into a bitstream;
  e) determining if the current level of DWT decomposition is the predetermined level of DWT decomposition, including
    ea) encoding the coefficients of the LL subband into the bitstream, if the current level of DWT decomposition is the predetermined level of DWT decomposition, and repeating steps b) to e), and
    eb) storing coefficients not previously encoded of the LL subband if the current level of DWT decomposition is not the predetermined level of DWT decomposition; and
  f) determining if the number of stored coefficients of the LL subband at the current level of DWT decomposition is at least a predetermined number dependent on the specified block size, including
    fa) assigning the predetermined number of LL coefficients as a current tile, if the number of stored LL coefficients is at least the predetermined number, and repeating steps c) to f), and
    fb) repeating steps b) to f) if the number of stored LL coefficients is less than the predetermined number.

13. A method according to claim 12, wherein the specified block size comprises H coefficients in the first dimension by W coefficients in the second dimension.

14. A method according to claim 13, wherein the number of coefficients in the first dimension is equal to the number of coefficients in the second dimension of the specified block (W=H).

15. A method according to claim 13, wherein the predetermined level of DWT decomposition is J and the minimum number of pixels in a first dimension of each tile is defined by $2^J H+O(2^J-1)$, where O is an overlap required by the DWT filter.

16. A method according to claim 15, wherein the number of pixels in a second dimension of each tile is less than that of the first dimension and is defined by 2W+O.

17. A method according to claim 15, wherein the DWT filter is a Daubechies 9/7 filter and the overlap required is 7 pixels or coefficient (O=7).

18. A method according to claim 15, wherein the DWT filter is a Haar filter and the overlap required is no pixels or coefficient (O=0).

19. A method according to claim 12, wherein the encoding is preformed by a Bit-plane entropy Encoder.

20. A method according to claim 12, wherein the encoding is preformed by an Arithmetic Encoder.

21. A method according to claim 12, wherein the encoding is preformed by a hybrid encoder comprising an Arithmetic and Bit-plane entropy Encoder.

22. An apparatus for encoding an image, the image being capable of being transformed by a discrete wavelet transform (DWT) to a predetermined level of decomposition and capable of being encoded on a block by block basis, each block having a specified block size in number of coefficients, in a first dimension and a second dimension, the apparatus comprising:
  a) means for dividing the image into a plurality of tiles, each tile having firstly, substantially a minimum number of pixels required to produce the number of coefficients in the first dimension of the block at the predetermined level of DWT decomposition, wherein the predetermined level of DWT decomposition is greater than one, and secondly, less than a minimum number of pixels required to produce the number of coefficients in the second dimension of the block at the predetermined level of DWT decomposition;

b) selecting means for selecting a current tile;

c) decomposing means for decomposing the current tile using the DWT to one level of decomposition to form a plurality of subbands including a LL, LH, HL and HHH subband;

d) means for accumulating a predetermined number of coefficients, dependent on the specified block size, of the LL sub-band coefficients;

e) means for assigning, as a current tile, the predetermined number of accumulated LL subband coefficients;

f) means for feeding back the current tile to the decomposing means for decomposing the current tile to a further level of decomposition;

g) means for accumulating coefficients in each subband of the LH, HL and HH subbands to form blocks of the specified size, and accumulating at least one block of the specified block size in the LL subband at the predetermined level; and h) encoding means for encoding each block to a bit stream as each block is formed, wherein said encoding means (h) encodes LH, HL and HH subbands to the bit stream when said accumulating means (g) forms corresponding blocks of the specified block size.

23. An apparatus according to claim 22, wherein said encoder means is a bit-plane entropy encoder.

24. An apparatus according to claim 22, wherein said encoder means is an Arithmetic Encoder.

25. An apparatus according to claim 22, wherein said encoder means is a hybrid encoder comprising an Arithmetic Encoder and Bit-plane entropy Encoder.

26. An apparatus for encoding an image, the image being capable of being transformed by a discrete wavelet transform (DWT) to a predetermined level of decomposition, and capable of being encoded on a block by block basis, each block having a specified block size in number of coefficients, in a first dimension and a second dimension, the apparatus comprising:

storage means for storing at least a portion of the image, the portion of the image having firstly, substantially a minimum number of pixels required to produce the number of coefficients in the first dimension of the block at the predetermined level of DWT decomposition, wherein the predetermined level of DWT decomposition is greater than one, and secondly, less than a minimum number of pixels required to produce the number of coefficients in the second dimension of the block at the predetermined level of DWT decomposition;

first and second filtering means for successively applying a linear transform to a first dimension and a second dimension of corresponding image portions respectively to provide LL, LH, HL and HH subbands, each subband comprising at least one coefficient;

partial band storage means for accumulating a predetermined number of coefficients, dependent on the specified block size, of the LL subband, and using the accumulated LL coefficient as an image portion for refiltering by said first and second filtering means to achieve a next level decomposition;

subband storage means for accumulating the blocks of specified block size for each level in the LH, HL and HH subbands, and accumulating the blocks of specified block size in the LL subband at the predetermined level of decomposition; and encoder means for encoding each accumulated block into a bit stream as each block is formed, wherein said encoder means encodes the LH, HL and HH subbands to the bit stream when said subband storage means accumulates corresponding blocks of the specified block size.

27. An apparatus according to claim 26, wherein said encoder means is a bit-plane entropy encoder.

28. An apparatus according to claim 26, wherein said encoder means is an Arithmetic Encoder.

29. An apparatus according to claim 26, wherein said encoder means is a hybrid encoder comprising an Arithmetic Encoder and Bit-plane entropy Encoder.

30. A computer readable memory medium for storing a program for an apparatus which encodes a digital image comprising a plurality of pixels, the image being able to be transformed by a discrete wavelet transform (DWT) to a predetermined level of decomposition and capable of being encoded on a block by block basis, each block having a specified block size in number of coefficients, in a first dimension and a second dimension, said program comprising:

a) code for a dividing step, of dividing the image into a plurality of tiles, each tile having firstly, substantially a minimum number of pixels required to produce the number of coefficients in the first dimension of the block at the predetermined level of DWT decomposition, wherein the predetermined level of DWT decomposition is greater than one, and secondly, less than a minimum number of pixels required to produce the number of coefficients in the second dimension of the block at the predetermined level of DWT decomposition;

b) code for a selecting step, of selecting a current tile;

c) code for a decomposing step, of decomposing the current tile, using the DWT, to one level of decomposition to form a plurality of subbands including an LL, LH, HL and HH subband;

d) code for an accumulating step, of accumulating coefficients in each subband of the LH, HL and HH subbands to form blocks of the specified block size and for encoding each block to a bit stream;

e) code for an accumulating step, of accumulating LL subband coefficients, and for repeating steps b) to e) until a predetermined number of coefficients, dependent on the specified block size, of the LL subband have been accumulated;

f) code for an assigning step, of assigning as a current tile the predetermined number of accumulated LL subband coefficients;

g) code for repeating steps c) to g) until the predetermined level of DWT decomposition is reached; and h) code for an encoding step, of encoding the LL subband into the bit stream.

31. A computer readable memory medium according to claim 30, wherein said code for accumulating coefficients in each subband is adapted to include steps for accumulating coefficients in corresponding subbands of different tiles.

32. A computer readable memory medium according to claim 30, wherein said code for encoding is adapted to include steps for encoding each block substantially as each block is accumulated.

33. A computer readable memory medium according to claim 30, said code being adapted so that the specified block size comprises H coefficients in the first dimension by W coefficients in the second dimension.

34. A computer readable memory medium according to claim 33, said code being adapted so that the number of coefficients in the first dimension is equal to the number of coefficients on the second dimension (W=H).

35. A computer readable memory medium according to claim 33, said code being adapted so that the predetermined level of DWT decomposition is J and the minimum number of pixels in a first dimension of each tile is defined by $2^J H+O(2^J-1)$, where O is an overlap required by the DWT filter.

36. A computer readable memory medium according to claim 35, said code being adapted so that the number of pixels in a second dimension of each tile is less than that of the first dimension and is defined by 2W+O.

37. A computer readable memory medium according to claim 35, said code being adapted so that the DWT filter is a Daubechies 9/7 filter and the overlap required is 7 pixels or coefficients (O=7).

38. A computer readable memory medium according to claim 35, said code being adapted so that the DWT filter is a Haar filter and the overlap required is no pixels or coefficients (O=0).

39. A computer readable memory medium for storing a program for an apparatus which encodes a digital image comprising a plurality of pixels, the image being able to be transformed by a discrete wavelet transform (DWT) to a predetermined level of decomposition and capable of being encoded on a block by block basis, each block having a specified block size in number of coefficients, in a first dimension and a second dimension, said program comprising:
  a) code for a dividing step, of dividing the image into a plurality of tiles, each tile having firstly, substantially a minimum number of pixels required to produce the number of coefficients in the first dimension of the block at the predetermined level of DWT decomposition, wherein the predetermined level of DWT decomposition is greater than one, and secondly, less than a minimum number of pixels required to produce the number of coefficients in the second dimension of the block at the predetermined level of DWT decomposition;
  b) code for a selecting step, of selecting a tile of the image as a current tile;
  c) code for a decomposing step, of decomposing the current tile, using the DWT filter, to provide a plurality of coefficients in LL, LH, HL and HH subbands;
  d) code for an encoding step, of encoding coefficients of the LH, HL, and HH subbands of a current level of DWT decomposition into a bitstream;
  e) code for a determining step, of determining if the current level of DWT decomposition is the predetermined level of DWT decomposition, including
    ea) code for an encoding step, of encoding the coefficients of the LL subband into the bitstream, if the current level of DWT decomposition is the predetermined level of DWT decomposition, and repeating steps b) to e), and
    eb) code for a storing step, of storing coefficients not previously encoded of the LL subband if the current level of DWT decomposition is not the predetermined level of DWT decomposition; and
  f) code for a determining step, of determining if the number of the stored coefficients of the LL subband at the current level of DWT decomposition is at least a predetermined number dependent on the specified block size, including
    fa) code for an assigning step, of assigning the predetermined number of LL coefficients as a current tile, if the number of stored LL coefficients is at least the predetermined number, and repeating steps c) to f), and
    fb) code for a repeating step, of repeating steps b) to f) if the number of stored LL coefficients is less than the predetermined number.

40. A computer readable memory medium according to claim 39, said code being adapted so that specified block size comprises H coefficients in the first dimension by W coefficients in the second dimension.

41. A computer readable memory medium according to claim 40, said code being adapted so that the number of coefficients in the first dimension is equal to the number of coefficients in the second dimension of the specified block (W=H).

42. A computer readable memory medium according to claim 40, said code being adapted so that the predetermined level of DWT decomposition is J and the minimum number of pixels in a first dimension of each tile is defined by $2^J H+O(2^J-1)$, where O is an overlap required by the DWT filter.

43. A computer readable memory medium according to claim 42, said code being adapted so that the number of pixels in a second dimension of each tile is less than that of the first dimension and is defined by 2W+O.

44. A computer readable memory medium according to claim 42, said code being adapted so that the DWT filter is a Daubechies 9/7 filter and the overlap required is 7 pixels or coefficients (O=7).

45. A computer readable memory medium according to claim 42, said code being adapted so that the DWT filter is a Haar filter and the overlap required is no pixels or coefficients (O=0).

46. A computer readable memory medium according to claim 39, wherein said steps for encoding are adapted to perform encoding in accordance with a bit-plane entropy encoding process.

47. A computer readable memory medium according to claim 39, wherein said steps for encoding are adapted to perform encoding in accordance with an Arithmetic Encoding process.

48. A computer readable memory medium according to claim 39, wherein said steps for encoding are adapted to performed encoding in accordance with a hybrid encoding process comprising Arithmetic and Bit-plane entropy encoding sub-processes.

49. A method of encoding a digital image on a block by block basis, block having a specified block size in number of coefficients, the method comprising the steps of:
  a) dividing the image into a plurality of tiles, each tile having a number of pixels less than required to produce the number of coefficients in the block, to decompose each tile to form a plurality of subbands including a LL, LH, HL and HH subband by using a discrete wavelet transform (DWT) to a predetermined level of decomposition greater than one;
  b) selecting a current tile;
  c) decomposing the current tile to form a plurality of subbands including a LL, LH, HL and HH subband by using the DWT;
  d) encoding LH, HL and HH subbands to a bit stream;
  e) accumulating LL subband coefficients and repeating steps b) to e) until a predetermined number of coefficients, dependent on the specified block size, of the LL subband have been accumulated;

f) assigning, as a current tile, the predetermined number of accumulated LL subband coefficients;

g) repeating steps c) to g) until the predetermined level of decomposition is reached; and h) encoding the LL subband to the bit stream.

50. An apparatus for encoding a digital image on a block by block basis, each block having a specified block size in number of coefficients, said apparatus comprising:

a) means for dividing the image into a plurality of tiles, each tile having a number of pixels less than required to produce the number of coefficients in the block, to decompose each tile to form a plurality of subbands including a LL, LH, HL and HH subband by using a discrete wavelet transform (DWT) to a predetermined level of decomposition greater than one;

b) selecting means for selecting a current tile;

c) decomposing means for decomposing the current tile to form a plurality of subbands including a LL, LH, HL and HH subband by using the DWT;

d) encoding means for encoding LH, HL and HH subbands to a bit stream;

e) means for accumulating LL subbands until a predetermined number of coefficients, dependent on the specified block size, of the LL subband have been accumulated;

f) means for assigning, as a current tile, the predetermined number of accumulated LL subband coefficients; and g) encoding means for encoding the LL subband to the bit stream.

* * * * *

UNITED STATES PATENT AND TRADEMARK OFFICE
CERTIFICATE OF CORRECTION

PATENT NO. : 6,978,048 B1
APPLICATION NO. : 09/523595
DATED : December 20, 2005
INVENTOR(S) : Paul Raymond Higgenbottom et al.

It is certified that error appears in the above-identified patent and that said Letters Patent is hereby corrected as shown below:

ON TITLE PAGE AT (57) ABSTRACT

Line 1, "an" should read --a--.

COLUMN 1

Line 16, "heirachical" should read --hierarchical--;
Line 21, "one dimensional" should read --one-dimensional--;
Line 25, "proc-esses" should read --processes--; and
Line 47, "an" should read --a--.

COLUMN 2

Line 13, "an" should read --a--.

COLUMN 3

Line 42, "provided" should read --provide--; and
Line 59, "an" should read --a--.

COLUMN 4

Line 30, "an" should read --a--; and
Line 35, "specifyied" should read --specified--.

COLUMN 5

Line 8, "an" should read --a--;
Line 49, "a image" should read --an image--;
Line 52, "a image" should read --an image--; and
Line 66, "pre-ferred" should read --preferred--.

COLUMN 6

Line 18, "and" should be deleted--; and
Line 21, "practiced." should read --practiced;--.

UNITED STATES PATENT AND TRADEMARK OFFICE
CERTIFICATE OF CORRECTION

PATENT NO. : 6,978,048 B1
APPLICATION NO. : 09/523595
DATED : December 20, 2005
INVENTOR(S) : Paul Raymond Higgenbottom et al.

It is certified that error appears in the above-identified patent and that said Letters Patent is hereby corrected as shown below:

COLUMN 7

Line 23, "produced" should read --produce--;
Line 27, "produced" should read --produce--;
Line 40, "617 pixel" should read --617 pixels--;
Line 46, "tile," should read --tiles,--;
Line 48, "iteration," should read --iterations,--; and
Line 61, "example" should read --example,--.

COLUMN 8

Line 6, "such" should read --such as--
Line 28, "line" should read --lines--;
Line 44, "pixel" should read --pixels; "71 pixel" should read --71 pixels--; and
Line 56, "subband," should read --subband--.

COLUMN 9

Line 1, "2H+7 line" should read --2H+7 lines--;
Line 25, "example" should read --example,--; and
Line 53, "read" should read --reads--.

COLUMN 10

Line 4, "code" should read --coded--.

COLUMN 11

Line 65, "done" should read --down--.

COLUMN 13

Line 21, "sub-sequent" should read --subsequent--;
Line 39, "thirty two" should read --thirty-two-- (both occurrences); and
Line 45, "sixty four" should read --sixty-four--.

UNITED STATES PATENT AND TRADEMARK OFFICE
CERTIFICATE OF CORRECTION

PATENT NO.        : 6,978,048 B1
APPLICATION NO.   : 09/523595
DATED             : December 20, 2005
INVENTOR(S)       : Paul Raymond Higgenbottom et al.

It is certified that error appears in the above-identified patent and that said Letters Patent is hereby corrected as shown below:

COLUMN 14

Line 54, "result" should read --results--; and
Line 63, "tion" should read --tions--.

COLUMN 15

Line 27, "example" should read --example,--;
Line 43, "were" should read --where--;
Line 58, "sixty four" should read --sixty-four--;
Line 61, "seventy one" should read --seventy-one--;
Line 62, "sixty fourth" should read --sixty-fourth--;
Line 64, "sixty four" should read --sixty-four--; "sixty eight" should read --sixty-eight--; and
Line 66, "seventy one" should read --seventy-one--.

COLUMN 17

Line 36, "coeffi-cients" should read --coefficients--.

COLUMN 21

Line 4, "bit" should read --bit in bit--.

COLUMN 22

Line 1, "significant," should read --significant),--; and
Line 38, "4 bit" should read --4 bits--.

COLUMN 23

Line 9, "A4 a" should read --A4, a--.

COLUMN 24

Line 2, "Thus" should read --¶ Thus--
Line 32, "code." should read --code).--;
Line 37, close up right margin; and
Line 38, close up left margin.

UNITED STATES PATENT AND TRADEMARK OFFICE
CERTIFICATE OF CORRECTION

PATENT NO. : 6,978,048 B1
APPLICATION NO. : 09/523595
DATED : December 20, 2005
INVENTOR(S) : Paul Raymond Higgenbottom et al.

It is certified that error appears in the above-identified patent and that said Letters Patent is hereby corrected as shown below:

COLUMN 25
Line 13, "simplicities" should read --simplicity's--.

COLUMN 28

Line 8, "decoding. The" should read --decoding, the--; and
Line 51, "sub-band" should read --subband--.

COLUMN 29

Line 11, "coefficients" should be deleted.

COLUMN 31

Line 7, "HHH subband;" should read --HH subband;--;
Line 10, "sub-band" should read --subband--;
Line 18, "specified size," should read --specified block size,--; and
Line 27, "bit-plane entropy encoder." should read --Bit-plane entropy Encoder.--.

COLUMN 32

Line 8, "bit-plane entropy encoder." should read --Bit-plane entropy Encoder. --.

COLUMN 33

Line 4, "on" should read --in--;
Line 18, "coefficients" should read --coefficient--; and
Line 22, "coefficients" should read --coefficient--.

UNITED STATES PATENT AND TRADEMARK OFFICE
CERTIFICATE OF CORRECTION

PATENT NO. : 6,978,048 B1
APPLICATION NO. : 09/523595
DATED : December 20, 2005
INVENTOR(S) : Paul Raymond Higgenbottom et al.

It is certified that error appears in the above-identified patent and that said Letters Patent is hereby corrected as shown below:

COLUMN 34,

Line 31, "coefficients" should read --coefficient--;
Line 35, "coefficients" should read --coefficient--;
Line 38, "bit-plane" should read --Bit-plane--;
Line 39, "encoding" should read --Encoding--;
Line 46, "performed" should read --perform--; and
Line 47, "encod-" should read --Encod---.

Signed and Sealed this

Fourth Day of July, 2006

JON W. DUDAS
*Director of the United States Patent and Trademark Office*